(12) United States Patent
Iwamoto et al.

(10) Patent No.: US 10,875,545 B2
(45) Date of Patent: Dec. 29, 2020

(54) AUTONOMOUS DRIVING SYSTEM

(71) Applicant: Toyota Jidosha Kabushiki Kaisha, Toyota (JP)

(72) Inventors: Takayuki Iwamoto, Shizuoka (JP); Sho Otaki, Yokohama (JP); Hojung Jung, Susono (JP); Shintaro Shiba, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/704,640

(22) Filed: Dec. 5, 2019

(65) Prior Publication Data

US 2020/0180657 A1   Jun. 11, 2020

(30) Foreign Application Priority Data

Dec. 7, 2018   (JP) .................................. 2018-229977

(51) Int. Cl.
| | |
|---|---|
| *G06T 7/62* | (2017.01) |
| *B60W 40/09* | (2012.01) |
| *B60W 50/14* | (2020.01) |
| *G05D 1/00* | (2006.01) |
| *G05D 1/02* | (2020.01) |
| *G06K 9/00* | (2006.01) |

(52) U.S. Cl.
CPC ............ *B60W 50/14* (2013.01); *B60W 40/09* (2013.01); *G05D 1/0088* (2013.01); *G05D 1/0212* (2013.01); *G06K 9/00805* (2013.01); *G06T 7/62* (2017.01); *B60W 2050/143* (2013.01); *B60W 2050/146* (2013.01); *G05D 2201/0213* (2013.01); *G06T 2207/30261* (2013.01)

(58) Field of Classification Search
None
See application file for complete search history.

(56) References Cited

U.S. PATENT DOCUMENTS

| | | | |
|---|---|---|---|
| 2009/0024357 A1 | 1/2009 | Aso et al. | |
| 2016/0246298 A1* | 8/2016 | Sato | ..................... B60W 40/08 |

(Continued)

FOREIGN PATENT DOCUMENTS

| | | | |
|---|---|---|---|
| JP | 2007-230454 A | 9/2007 | |
| JP | 2008-117140 A | 5/2008 | |

(Continued)

*Primary Examiner* — Talha M Nawaz
(74) *Attorney, Agent, or Firm* — Dinsmore & Shohl LLP

(57) ABSTRACT

An autonomous driving system is configured to include a normal driving situation determination unit configured to determine whether or not an autonomous driving is in a normal driving situation, a driver situation recognition unit configured to recognize at least one of a reaction delay time of a driver against the changes in an external environment of a vehicle, a warning reaction delay time of the driver against the warning, and a driver's non-driving action time, an overconfidence determination unit configured to determine whether or not the driver is in a system overconfidence state, and a warning control unit configured to output an alert if it is determined by the normal driving situation determination unit that the autonomous driving is in the normal driving situation and if it is determined by the overconfidence determination unit that the driver is in the system overconfidence state.

10 Claims, 10 Drawing Sheets

(56) References Cited

U.S. PATENT DOCUMENTS

2017/0261982 A1    9/2017   Otaki et al.
2018/0120840 A1    5/2018   Palmer et al.

FOREIGN PATENT DOCUMENTS

| JP | 2008-158969 A | 7/2008 |
| --- | --- | --- |
| JP | 2015-032054 A | 2/2015 |
| JP | 2015-032291 A | 2/2015 |
| JP | 2016-066279 A | 4/2016 |
| JP | 2017-162406 A | 9/2017 |

\* cited by examiner

AUTONOMOUS DRIVING SYSTEM

TECHNICAL FIELD

The present disclosure relates to an autonomous driving system.

CROSS-REFERENCE TO RELATED APPLICATION

This application claims the benefit of priority from Japanese Patent Application No. 2018-229977, filed Dec. 7, 2018, the entire contents of which are incorporated herein by reference.

BACKGROUND

In the related art, Japanese Unexamined Patent Application Publication No. 2015-032054 is known as a technical literature relating to an autonomous driving system. This publication discloses an over-dependence deterrence device which determines the driver's overconfidence in a driving support system that supports driving of a vehicle, and if it is determined that the driver is in an overconfidence state, then, performs at least one of the warning to the driver that the driver is in the overconfidence state and suppression of the driving support control.

SUMMARY

Incidentally, in recent years, a development of an autonomous driving system capable of performing autonomous driving under certain conditions, has been promoted. In such autonomous driving, since it is necessary for the driver to perform the driving operation of the vehicle at an emergency, there is a problem of the driver's delayed response due to the driver's overconfidence in the autonomous driving system. For this reason, it is required to appropriately eliminate the driver's overconfidence state.

Therefore, in this technical field, it is desirable to provide an autonomous driving system that can appropriately eliminate the driver's system overconfidence state during the autonomous driving.

According to an aspect of the present disclosure, there is provided an autonomous driving system that performs an autonomous driving of a vehicle and provides various warnings to a driver of the vehicle during the autonomous driving. The system is configured to include: a vehicle position recognition unit configured to recognize a position of the vehicle on a map; an external environment recognition unit configured to recognize an external environment of the vehicle; a travel state recognition unit configured to recognize a travel state of the vehicle; a trajectory generation unit configured to generate a trajectory of the vehicle used for the autonomous driving based on map information, the position of the vehicle on the map, the external environment of the vehicle, and the travel state of the vehicle; a normal driving situation determination unit configured to determine whether or not the autonomous driving is in a normal driving situation based on at least one of the position of the vehicle on the map, the external environment of the vehicle, the travel state of the vehicle, and the trajectory of the vehicle; a driver situation recognition unit configured to recognize at least one of a reaction delay time of the driver against changes in the external environment of the vehicle, a warning reaction delay time of the driver against the warning, and a driver's non-driving action time; an overconfidence determination unit configured to determine whether or not the driver is in a system overconfidence state based on a result of recognition performed by the driver situation recognition unit; and a warning control unit configured to output an alert when the normal driving situation determination unit determined that the autonomous driving is in the normal driving situation and the overconfidence determination unit determined that the driver is in the system overconfidence state.

According to the autonomous driving system in the aspect of the present disclosure, the alert is output if it is determined by the normal driving situation determination unit that the autonomous driving is in the normal driving situation and if it is determined by the overconfidence determination unit that the driver is in the system overconfidence state. In this way, in the autonomous driving system, it is possible to appropriately eliminate the driver's system overconfidence state during the autonomous driving by awakening the driver who is in the system overconfidence state by outputting the alert while ensuring that the autonomous driving is in the normal driving situation.

The autonomous driving system in the aspect of the present disclosure may be configured to further include an anxiety elicitation situation determination unit configured to determine whether or not the vehicle in the autonomous driving is in the anxiety elicitation situation based on the external environment of the vehicle. The warning control unit outputs the alert when it is determined by the anxiety elicitation situation determination unit that the vehicle is not in the anxiety elicitation situation in case where the normal driving situation determination unit determined that the autonomous driving is in the normal driving situation and the overconfidence determination unit determined that the driver is in the system overconfidence state, and does not output the alert when it is determined by the anxiety elicitation situation determination unit that the vehicle is in the anxiety elicitation situation in case where the normal driving situation determination unit determined that the autonomous driving is in the normal driving situation and the overconfidence determination unit determined that the driver is in the system overconfidence state.

The autonomous driving system in the aspect of the present disclosure may be configured to further include an anxiety elicitation situation determination unit configured to determine whether or not the vehicle in the autonomous driving is in the anxiety elicitation situation based on the external environment of the vehicle. The warning control unit outputs the alert when it is determined by the anxiety elicitation situation determination unit that the vehicle is not in the anxiety elicitation situation in case where the normal driving situation determination unit determined that the autonomous driving is in the normal driving situation and the overconfidence determination unit determined that the driver is in the system overconfidence state, and outputs the alert in a delayed manner when it is determined by the anxiety elicitation situation determination unit that the vehicle is in the anxiety elicitation situation in case where the normal driving situation determination unit determined that the autonomous driving is in the normal driving situation and the overconfidence determination unit determined that the driver is in the system overconfidence state.

In the autonomous driving system in the aspect of the present disclosure, the anxiety elicitation situation determination unit may be configured to determine that the vehicle in the autonomous driving is in the anxiety elicitation situation if an area of a moving object in a captured image by a camera that images ahead of the vehicle as the external environment of the vehicle is equal to or greater than an anxiety elicitation threshold value.

In the autonomous driving system in the aspect of the present disclosure, the driver situation recognition unit may be configured to store the warning reaction delay time of the driver against the warning as a reference reaction delay time, and the overconfidence determination unit may be configured to determine that the driver is in the system overconfidence state if a difference obtained by subtracting the reference reaction delay time from the reaction delay time of the driver against the changes in the external environment of the vehicle is equal to or longer than an overconfidence threshold value.

The autonomous driving system in the aspect of the present disclosure is configured to further include a system confidence degree calculation unit configured to calculate a system confidence degree regarding the autonomous driving based on at least one of the position of the vehicle on the map, the external environment of the vehicle, the travel state of the vehicle, and the trajectory of the vehicle. The normal driving situation determination unit may be configured to determine that the autonomous driving is not in the normal driving situation if the system confidence degree is lower than a normal driving threshold value.

According to the autonomous driving system in an aspect of the present disclosure, it is possible to appropriately eliminate the driver's system overconfidence state during the autonomous driving.

DETAILED DESCRIPTION

Hereinafter, embodiments of the present disclosure will be described with reference to the drawings.

First Embodiment

Figure 1:
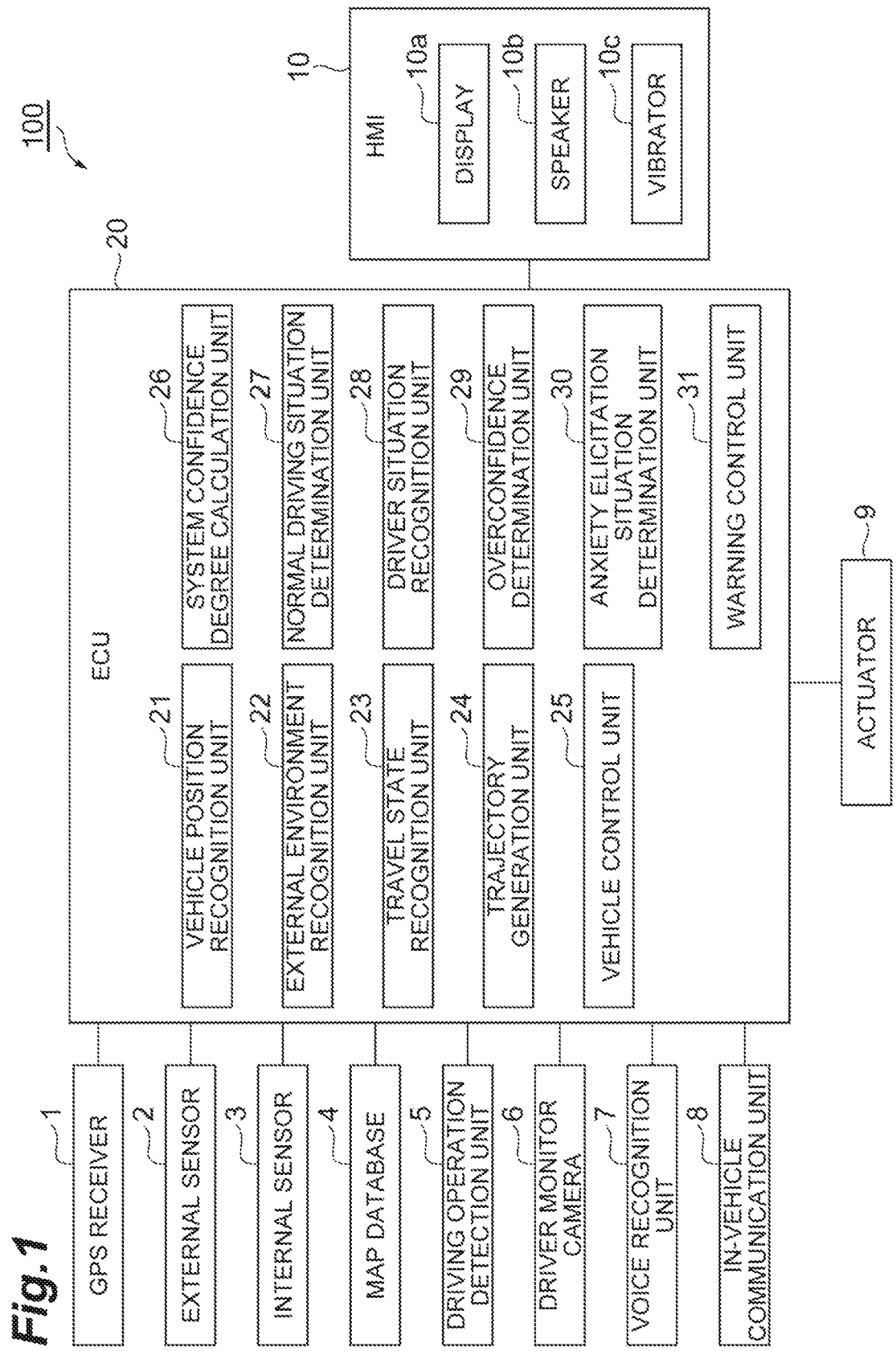
FIG. 1 is a block diagram illustrating an autonomous driving system in a first embodiment.

FIG. 1 is a block diagram illustrating an autonomous driving system in a first embodiment. An autonomous driving system 100 illustrated in FIG. 1 is mounted on a vehicle such as a passenger car, and performs an autonomous driving of the vehicle. The autonomous driving is a vehicle control that causes the vehicle to autonomously travel toward a destination set in advance. In the autonomous driving, the driver does not need to perform a driving operation, and the vehicle travels autonomously. In addition, the autonomous driving system 100 performs various warnings to the driver of the vehicle during the autonomous driving. Details of the warning will be described later.

Configuration of Autonomous Driving System

As illustrated in FIG. 1, the autonomous driving system 100 includes an electronic control unit (ECU) 20 that performs overall management of the system. The ECU 20 is an electronic control unit including a central processing unit (CPU), read only memory (ROM), random access memory (RAM), and the like. In the ECU 20, for example, various functions are realized by loading a program stored in the ROM into the RAM and executing the program loaded in the RAM by the CPU. The ECU 20 may be configured with a plurality of electronic units.

The ECU 20 is connected to a GPS receiver 1, an external sensor 2, an internal sensor 3, a map database 4, a driving operation detection unit 5, a driver monitor camera 6, a voice recognition unit 7, an in-vehicle communication unit 8, an actuator 9, and a human machine interface (HMI) 10.

The GPS receiver 1 measures a position of the vehicle (for example, the latitude and longitude of the vehicle) by receiving signals from three or more GPS satellites. The GPS receiver 1 transmits information on the measured position of the vehicle to the ECU 20. Instead of the GPS receiver 1, a global navigation satellite system (GNSS) receiver may be used.

The external sensor 2 is a detection device that detects a surrounding situation of the vehicle. The external sensor 2 includes at least one of a camera and a radar sensor.

The camera is an imaging device that images an external situation of the vehicle. The camera is provided on the inside of a windshield of the vehicle. The camera transmits the imaging information relating to the external situation of the vehicle to the ECU 20. The camera may be a monocular camera or may be a stereo camera.

The radar sensor is a detection device that detects objects around the vehicle using at least one of radio waves (for example, millimeter waves) and light. The radar sensor includes, for example, at least one of the millimeter wave radar and a light detection and ranging (LIDAR). The radar sensor transmits at least one of the radio wave and the light to the surroundings of the vehicle, and detects the objects by receiving radio waves or light reflected from the objects. The radar sensor transmits the detected object information to the ECU 20. The objects include fixed objects such as guard rails and buildings, as well as moving objects such as pedestrians, bicycles, and other vehicles. The external sensor 2 does not necessarily need to include the radar sensor.

The internal sensor 3 is a detection device that detects a travel state of the vehicle. The internal sensor 3 includes a vehicle speed sensor, an accelerator sensor, and a yaw rate sensor. The vehicle speed sensor is a measuring device that measures a speed of the vehicle. As the vehicle speed sensor, for example, a vehicle wheel speed sensor is used, which is provided on at least one of the vehicle wheels of the vehicle and a drive shaft rotating integrally with vehicle wheels, and measures a rotational speed of the vehicle wheels. The vehicle speed sensor transmits the measured vehicle speed information (wheel speed information) to the ECU 20.

The accelerator sensor is a measuring device that measures an acceleration of the vehicle. The accelerator sensor includes, for example, a longitudinal accelerator sensor that measures acceleration in the longitudinal direction of the vehicle and a lateral accelerator sensor that measures a lateral acceleration of the vehicle. The accelerator sensor, for example, transmits the acceleration information of the vehicle to the ECU 20. The yaw rate sensor is a measuring device that measures a yaw rate (rotation angular velocity) around the vertical axis at the center of gravity of the vehicle. As the yaw rate sensor, for example, a Gyro sensor can be used. The yaw rate sensor transmits the measured yaw rate information of the vehicle to the ECU 20.

The map database 4 is a database that stores map information. The map database 4 is formed, for example, in a hard disk drive (HDD) mounted on the vehicle. The map information includes position information on a lane, information on a shape of the lane (for example, a curve, a lane width, or the like), position information on a stop line, information on positions of a merge point and a branch, and position information on structures. The map information may also include speed related information such as a legal speed associated with at least one of the position and a section on the map. The map information may also include position information on marking objects such as utility poles used for vehicle position recognition. The map database 4 may be stored in a server such as a management center that can communicate with the vehicle.

The driving operation detection unit 5 detects the operation of the operation portion of the vehicle by the driver. The driving operation detection unit 5 includes, for example, a steering sensor, an accelerator sensor, and a brake sensor. The operation portion of the vehicle is a device for the driver to input the operation for the operation of the vehicle. The operation portion of the vehicle includes at least one of a steering portion of the vehicle, an accelerator operation portion of the vehicle, and a brake operation portion of the vehicle. The steering portion is, for example, a steering wheel. The steering portion is not limited to be in a form of a wheel, but may be configured to function as a steering device. The accelerator operation portion is, for example, an accelerator pedal. The brake operation portion is, for example, a brake pedal. The accelerator operation portion and the brake operation portion do not necessarily need to be pedals, and may be configured such that the driver can input acceleration or deceleration.

The steering sensor includes a steering touch sensor that detects gripping of the steering portion by the driver. For example, a capacitance type touch sensor can be used as the steering touch sensor. The steering touch sensor is provided on the left and right sides of the steering portion to detect the grip by the driver's hands. The steering sensor may measure an operation amount of the steering portion by the driver. The operation amount of the steering portion includes at least one of a steering angle and a steering torque.

The accelerator sensor measures an operation amount of the accelerator operation portion by the driver. The operation amount of the accelerator operation portion includes, for example, a depression amount of the accelerator pedal. The brake sensor measures an operation amount of the brake operation portion by the driver. The operation amount of the brake operation portion includes, for example, a depression amount of the brake pedal. The operation amounts of the accelerator operation portion and the brake operation portion may include the depression speed. The driving operation detection unit 5 transmits the operation amount information on the measured operation amount by the driver to the ECU 20.

The driver monitor camera 6 is an imaging device that images the driver of the vehicle. The driver monitor camera 6 is provided, for example, at the position of the front of the driver on the cover of the steering column of the vehicle, and images the driver. A plurality of driver monitor cameras 6 may be provided in order to image the driver from a plurality of directions. The driver monitor camera 6 transmits information of imaging the driver to the ECU 20. The autonomous driving system 100 does not necessarily need use the driver monitor camera 6.

The voice recognition unit 7 is a device that recognizes the voice of the occupant in the vehicle compartment. The voice recognition unit 7 includes, for example, a microphone for collecting the voice in the vehicle compartment. A plurality of microphones may be provided in the vehicle compartment. The voice recognition unit 7 transmits the result of recognition of the voice of the occupant in the vehicle compartment to the ECU 20. The voice recognition unit 7 does not necessarily need to recognize the voice of the occupant as a language, and may only determine whether or not the occupants are in conversation. The voice recognition unit 7 may have a voice personal authentication function, and may determine whether or not the driver is in conversation based on the voice.

The voice recognition unit 7 may be, for example, always in a voice recognition state. The voice recognition unit 7 may function as a so-called smart speaker. In addition, the voice recognition unit 7 may configure a part of the HMI 10 described later. The voice recognition unit 7 may recognize a sound (such as a traveling sound of another vehicle, an engine sound of another vehicle, or the like) reaching the vehicle compartment from the outside of the vehicle. The autonomous driving system 100 does not necessarily need to use the voice recognition unit 7.

The in-vehicle communication unit 8 is a device for the ECU 20 to communicate with various information terminals in the vehicle. The various information terminals include, for example, at least one of smartphones, tablet personal computers, and wearable devices of the occupants. The wearable devices include watch-type wearable devices, glasses-type wearable devices, and the like. The in-vehicle communication unit 8 communicates with the information terminals to acquire information such as whether or not the smartphones are in operation. The in-vehicle communication unit 8 may acquire driver's biometric information by communicating with the wearable devices. The biological information includes at least one of heartbeat, brain waves, blood pressure, body temperature and the like. The in-vehicle communication unit 8 transmits to the ECU 20 the various information acquired by the communication. The autonomous driving system 100 does not necessarily need to use the in-vehicle communication unit 8.

The actuator 9 is a device used for controlling the vehicle. The actuator 9 includes at least a throttle actuator, a brake actuator and a steering actuator. The throttle actuator controls a driving force of the vehicle by controlling an amount of air (throttle opening degree) supplied to the engine according to the control signal from the ECU 20. If the vehicle is a hybrid vehicle, in addition to the amount of air supplied to the engine, the control signal from the ECU 20 is input to a motor as a power source, and the driving force of the vehicle is controlled. If the vehicle is an electric vehicle, instead of the throttle actuator, the control signal from the ECU 20 is input to a motor as a power source, and the driving force of the vehicle is controlled. The motor as the power source in these cases configures the actuator 9.

The brake actuator controls the brake system according to the control signal from the ECU 20 and controls a braking force applied to the wheels of the vehicle. For example, a hydraulic brake system can be used as the brake system. The steering actuator controls the driving of an assist motor controlling a steering torque of an electric power steering system according to the control signal from the ECU 20.

The HMI 10 is a device for performing input and output of information between the autonomous driving system 100 and the occupants. The HMI 10 includes a display 10*a*, a speaker 10*b*, and a vibrator 10*c*.

The display 10*a* is a display provided in the vehicle. The display 10*a* is provided, for example, on a dashboard of the vehicle. The display 10*a* displays various images according to the control signal from the ECU 20. The display 10*a* may be a head-up display that projects and displays an image on the windshield of the vehicle. The display 10*a* may include a multi-information display provided on an instrument panel of the vehicle. The display 10*a* may include a blind spot monitor provided on side view mirrors of the vehicle.

The speaker 10*b* is an audio output device provided in the vehicle. The speaker 10*b* is provided, for example, on the inside of the door of the vehicle and on the back of the instrument panel. The speaker 10*b* performs various sound outputs according to the control signal from the ECU 20.

The vibrator 10*c* is a vibration actuator for performing the warning on the driver using the output of the vibration. The vibration actuator is provided, for example, on at least one of the steering portion of the vehicle, a seat of the driver's seat, a headrest of the driver's seat, an armrest of the driver's seat, the accelerator pedal, and the brake pedal. The vibrator 10*c* outputs the vibration according to the control signal from the ECU 20. The HMI 10 does not necessarily need to include the vibrator 10*c*.

Next, a functional configuration of the ECU 20 will be described. The ECU 20 includes a vehicle position recognition unit 21, an external environment recognition unit 22, a travel state recognition unit 23, a trajectory generation unit 24, a vehicle control unit 25, a system confidence degree calculation unit 26, a normal driving situation determination unit 27, and a driver situation recognition unit 28, an overconfidence determination unit 29, an anxiety elicitation situation determination unit 30, and a warning control unit 31. A part of the functions of the ECU 20 described above may be performed by a server capable of communicating with the vehicle.

The vehicle position recognition unit 21 recognizes a position of the vehicle on the map based on the position information from the GPS receiver 1 and the map information in the map database 4. In addition, the vehicle position recognition unit 21 may estimate the position of the vehicle on the map the simultaneous localization and mapping (SLAM) technology using the position information of the marking object included in the map information in the map database 4 and the results of detection performed by the external sensor 2. The vehicle position recognition unit 21 may recognize the position of the vehicle on the map using a known method.

The external environment recognition unit 22 recognizes the external situation around the vehicle based on the result of detection (the object information by the radar sensor and/or the imaging information by the camera) performed by the external sensor 2. The external environment includes a situation of objects around the vehicle. The situation of the object is, for example, a relative position and a relative speed of the object relative to the vehicle.

The external environment may include recognition results of lane lines (a lane boundary line, a center line, and the like) around the vehicle. The external environment recognition unit 22 recognizes the relative position of the lane line relative to the vehicle by well-known lane line recognition based on the result of detection performed by the external sensor 2. The external environment recognition unit 22 may recognize a sound from the outside recognized by the voice recognition unit 7 from the outside of the vehicle compartment as a part of the external environment. If an external sound detector (such as a microphone) that detects the sounds outside of the vehicle is provided in the vehicle, the external environment recognition unit 22 may recognize the sounds detected by the external sound detector as a part of the external environment.

The travel state recognition unit 23 recognizes the travel state of the traveling vehicle based on the result of measurement performed by the internal sensor 3. The travel state includes the speed of the vehicle, the acceleration of the vehicle, and the yaw rate of the vehicle. Specifically, the travel state recognition unit 23 recognizes the speed of the vehicle based on the vehicle speed information from the vehicle speed sensor. The travel state recognition unit 23 recognizes the acceleration (a longitudinal acceleration and a lateral acceleration) of the vehicle based on the vehicle speed information from the accelerator sensor. The travel state recognition unit 23 recognizes the direction of the vehicle based on the yaw rate information from the yaw rate sensor.

The trajectory generation unit 24 generates a trajectory to be used for the autonomous driving of the vehicle. The trajectory generation unit 24 generates the route for the autonomous driving based on a destination set in advance, the map information in the map database 4, the position of the vehicle recognized by vehicle position recognition unit 21, the external environment of vehicle recognized by external environment recognition unit 22, and the travel state (the vehicle speed, the yaw rate, and the like) recognized by the travel state recognition unit 23. The destination may be set by the occupant of the vehicle, or may be proposed by at least one of the autonomous driving system 100 and a known navigation system.

The trajectory generation unit 24 obtains the traveling route for the autonomous driving based on the destination, the map information, and the position of the vehicle on the map. The traveling route is a route on which the vehicle travels in autonomous driving and is a route from the position of the vehicle on the map (the current position) to the destination. The traveling route may be set by a well-known navigation system. The traveling route can be represented as a route on a lane-by-lane basis, for example. The trajectory generation unit 24 generates a route for autonomously driving the vehicle along the traveling route from the map information.

The route includes a path on which the vehicle travels in the autonomous driving and the vehicle speed profile for the autonomous driving. The path is a trajectory on which the autonomously driving vehicle will travel on the traveling route. The path can be data of the steering angle change (a steering angle profile) of the vehicle corresponding to the position on the traveling route, for example. The position on the traveling route is, for example, a set longitudinal position which is set at a predetermined interval (for example, 1 m) in the traveling direction of the traveling route. The steering angle profile is data in which the target steering angle is associated with each set longitudinal position.

The trajectory generation unit 24 generates the path on which the vehicle travels based on, for example, the traveling route, the map information, the external environment of the vehicle, and the travel state of the vehicle. The trajectory generation unit 24 generates the path such that the vehicle passes through the center of the lane included in the traveling route.

The vehicle speed profile is data in which the target vehicle speed is associated with each set longitudinal position, for example. The set longitudinal position may be set based on the traveling time of the vehicle instead of the distance. The set longitudinal position may be set as an arrival position of the vehicle after one second and the arrival position of the vehicle after two seconds.

The trajectory generation unit 24 generates the vehicle speed profile based on, for example, the path and speed related information such as a legal speed included in the map information. Instead of the legal speed, a set speed may be used, which is set in advance for at least one of the position and the section on the map. The trajectory generation unit 24 generates the trajectory for the autonomous driving from the path and the vehicle speed profile. The trajectory is not limited to the description above. Any trajectory can be used as long as the trajectory includes the necessary information to realize the autonomous driving of the vehicle.

The vehicle control unit 25 performs the autonomous driving of the vehicle. The vehicle control unit 25 performs the autonomous driving of the vehicle based on the map information, the position of the vehicle on the map, the external environment of the vehicle, the travel state of the vehicle, and the trajectory. The vehicle control unit 25 performs the autonomous driving along the trajectory generated by the trajectory generation unit 24 and autonomously performs emergency avoidance and the like in an emergency. The vehicle control unit 25 performs the autonomous driving of the vehicle by transmitting the control signals to the actuator 9.

The system confidence degree calculation unit 26 calculates a system confidence degree regarding the autonomous driving by the autonomous driving system 100 based on at least one of the position of the vehicle on the map, the external environment of the vehicle, the travel state of the vehicle, and the trajectory of the vehicle. The system confidence degree is an index indicating the reliability (certainty) of the autonomous driving in the autonomous driving system 100. The system confidence degree corresponds to the possibility of continuity for the autonomous driving.

If the system confidence degree falls below a termination threshold value, the autonomous driving system 100 may end the autonomous driving control and switch the driving mode to a driver-based driving. The driver-based driving includes a manual driving by a driver (full manual driving) and a driving by a driver supported by a driving support control such as adaptive cruise control ACC) and lane keeping assist (LKA). The termination threshold value is a threshold value having a value set in advance. Hereinafter, various "threshold values" used in the description of the present specification mean threshold values set in advance.

The system confidence degree calculation unit 26 calculates the system confidence degree based on, for example, the external environment of the vehicle recognized by the external environment recognition unit 22. Specifically, when the number of moving objects such as other vehicles around the vehicle is equal to or greater than a certain number, the system confidence degree calculation unit 26 may calculate the system confidence degree as a lower value compared to a case where the number of moving objects around the vehicle is less than the certain number. If there is a preceding vehicle within a certain distance ahead of the vehicle, the system confidence degree calculation unit 26 may calculate the system confidence degree as a lower value compared to a case where there is no preceding vehicle.

If there is a preceding vehicle within a certain distance ahead of the vehicle, the system confidence degree calculation unit 26 may calculate the system confidence degree as a lower value as the vehicle-to-vehicle distance between the vehicle and the preceding vehicle becomes shorter. If there is a following vehicle within a certain distance behind the vehicle, the system confidence degree calculation unit 26 may calculate the system confidence degree as a lower value compared to a case where there is no following vehicle. If there is a parallel vehicle running parallel to the vehicle, the system confidence degree calculation unit 26 may calculate the system confidence degree as a lower value compared to a case where there is no parallel vehicle.

If there is an object ahead of the vehicle with a time to collision (TTC) shorter than a TTC threshold value, the system confidence degree calculation unit 26 may calculate the system confidence degree as a lower value compared to a case where there is no object ahead of the vehicle with a time to collision longer than the TTC threshold value. The vehicle-to-vehicle time may be used instead of the time to collision.

If there is a pedestrian within a certain distance from the vehicle in the traveling direction of the vehicle, the system confidence degree calculation unit 26 may calculate the system confidence degree as a lower value compared to a case where there is no pedestrian. If there is a pedestrian moving in the direction crossing the trajectory of the vehicle, the system confidence degree calculation unit 26 may calculate the system confidence degree as a lower value compared to a case where there is no pedestrian. The same can be applied to a bicycle and a personal mobility instead of the pedestrians.

If another vehicle around the vehicle performs abnormal behavior, the system confidence degree calculation unit 26 may calculate the system confidence degree as a lower value compared to a case where the other vehicle does not perform the abnormal behavior. The abnormal behavior is an unusual behavior that another vehicle is not supposed to do in a standard traveling situation. The abnormal behavior can include rapid deceleration, rapid acceleration, rapid steering, lighting a hazard lamp, and the like. If another vehicle around the vehicle deviate from the normal behavior set in advance, the system confidence degree calculation unit 26 may recognize that the abnormal behavior is being performed. The normal behavior can be, for example, traveling along the lane at an acceleration and deceleration equal to or lower than threshold values respectively, and at a speed equal to or lower than the legal maximum speed of the lane.

If the shielding ratio of the detection range of the external sensor 2 due to the buildings, other vehicles, or the like is equal to or higher a shielding threshold value, the system confidence degree calculation unit 26 may calculate the system confidence degree as a lower value compared a case where the shielding ratio of the detection range of the external sensor 2 is lower than the shielding threshold value. The system confidence degree calculation unit 26 may recognize a marking object included in the detection range of the external sensor 2 on the map based on the position of the vehicle on the map and the position information of the marking object included in the map information, and may compare the result of recognition with the marking object (stationary object) recognized by the external environment recognition unit 22. If a difference number obtained by subtracting the number of marking objects recognized by the external environment recognition unit 22 from the number of marking objects included in the detection range of external sensor 2 on the map is equal to or greater than a difference threshold value, the system confidence degree calculation unit 26 may calculate the system confidence degree as a lower value compared to a case where the difference number is less than the difference threshold value. The system confidence degree calculation unit 26 may recognize the number of marking objects included in the detection range of the external sensor 2 on the map in consideration of the shielding of the detection range of the external sensor 2 due to the buildings or the like.

The system confidence degree calculation unit 26 may calculate the system confidence degree based on a tracking status of the moving objects such as other vehicles as the external environment of the vehicle. If the moving object being tracked within the detection range of external sensor 2 is lost, the system confidence degree calculation unit 26 may calculate the system confidence degree as a lower value compared to a case where the moving object is not lost. If at least one of the shape or the volume of the moving object being tracked is changed by a ratio equal to or higher than a certain percentage, since it is likely to erroneously recognize the multiple objects as one moving object, the system confidence degree calculation unit 26 may calculate the system confidence degree as a lower value compared to a case where at least one of the shape and the volume of the moving object is not changed. If a relative speed of the moving object being tracked is changed suddenly, since it is likely to erroneously recognize the multiple objects having different speeds as one object, the system confidence degree calculation unit 26 may calculate the system confidence degree as a lower value compared to a case where the relative speed of the moving object is not changed suddenly. For example, when the speed change within a certain time is equal to or larger than a sudden change threshold value, the system confidence degree calculation unit 26 can recognize that the relative speed has suddenly changed.

If the external environment of the vehicle includes the result of recognition of a traffic signal ahead of the vehicle, and when the shape of the recognized traffic signal does not match the shape of the traffic signal stored in the map information (for example, when the number of lights of the recognized traffic signal is three and an arrow light, and the number of lights of the traffic signal in the map information is three three-light type), the system confidence degree calculation unit 26 may calculate the system confidence degree as a lower value compared to a case where the shape of the recognized traffic signal matches the shape of the traffic signal stored in the map information. The dimension of the traffic signal may be considered as well as the shape of the traffic signal. In addition, instead of the traffic signal, at least one of the shape and the dimension of the marking object may be used.

If the external environment of the vehicle includes the weather around the vehicle, the system confidence degree calculation unit 26 may calculate the system confidence degree as a lower value when the weather around the vehicle is rainy compared to a case when the weather around the vehicle is clear. The weather around the vehicle can be determined based on at least one of the imaging information by the camera or the result of detection performed by the radar sensor. The weather around the vehicle may be determined based on an operation state of the windshield wiper of the vehicle.

The system confidence degree calculation unit 26 may calculate the system confidence degree based on a degree of interference of the moving object with the trajectory of the vehicle. The degree of interference of the moving object with the trajectory of the vehicle can be calculated, for example, using the method described in Japanese Patent Application No. 2007-230454. The system confidence degree calculation unit 26 calculates the system confidence degree as a lower value, for example, as the degree of interference of the moving object with the trajectory of the vehicle becomes higher.

The system confidence degree calculation unit 26 may calculate the system confidence degree based on a degree of danger of the moving object around the vehicle. The degree of danger of the moving object around the vehicle can be calculated, for example, using the method described in Japanese Patent Application No. 2008-158969. The system confidence degree calculation unit 26 calculates the system confidence degree as a lower value, for example, as the degree of danger of the moving object with respect to the trajectory of the vehicle becomes higher.

The system confidence degree calculation unit 26 may calculate the system confidence degree based on the position of the vehicle on the map recognized by the vehicle position recognition unit 21. For example, if the position recognition of the vehicle is performed using a marking object in addition to the position information in the GPS receiver 1, the system confidence degree calculation unit 26 calculates the system confidence degree as a lower value compared to a case where the position of the vehicle is recognized using only the position information in the GPS receiver 1.

If the vehicle is positioned in the area where the accuracy of the map information is low, the system confidence degree calculation unit 26 may calculate the system confidence degree as a lower value compared to a case where the vehicle is positioned in other areas. The information on whether or not the accuracy of map information is low is associated with the map information in advance, for example. If the number of GPS satellites from which the GPS receiver 1 is receiving the signals is equal to or greater than a GPS threshold value, the system confidence degree calculation unit 26 may calculate the system confidence degree as a lower value compared to a case where the number of GPS satellites is less than the GPS threshold value. If the arrangement of the GPS satellites from which GPS receiver 1 is receiving the signals is dispersed, the system confidence degree calculation unit 26 may calculate the system confidence degree as a lower value compared to a case where the arrangement of the GPS satellites from which the GPS receiver 1 is receiving the signals is concentrated.

If the number of recognized marking objects positioned around the vehicle is less than a marking object threshold value, the system confidence degree calculation unit 26 may calculate the system confidence degree as a lower value compared to a case where the number of recognized marking objects is equal to or greater than the marking object threshold value. If a positional relationship between multiple recognized marking objects around the vehicle does not match a positional relationship between each of the marking objects in map information, the system confidence degree calculation unit 26 may calculate the system confidence degree as a lower value compared to a case where the positional relationship between the recognized multiple marking objects matches the positional relationship between each of the marking objects in the map information. When the positional relationship between the multiple recognized marking objects around the vehicle does not match the positional relationship between each of the marking objects in map information, and when an average of position errors of each marking object is shorter than a certain distance, the system confidence degree calculation unit 26 may calculate the system confidence degree as a lower value compared to a case when the average of the position errors of each marking object is longer than a certain distance. A median value or a summed value may be used instead of the average.

When the vehicle is positioned in a complicated road environment such as intersections, crossings, merging points, and branches, the system confidence degree calculation unit 26 may calculate the system confidence degree as a lower value compared to a case where the vehicle is not positioned in the complex road environment. If the vehicle is positioned in the poor visibility area set in the map information in advance, the system confidence degree calculation unit 26 calculates the system confidence degree as a lower value compared to a case where the vehicle is not positioned in the poor visibility area.

The system confidence degree calculation unit 26 may calculate the system confidence degree based on the travel state of the vehicle recognized by the travel state recognition unit 23. If the result of measurement of the vehicle speed of the vehicle is an abnormal value, the system confidence degree calculation unit 26 may calculate the system confidence degree as a lower value compared to a case where the result of measurement of the vehicle speed is not the abnormal value. For example, when a difference between the vehicle speed measured one frame before and the vehicle speed measured current time is equal to or higher than an abnormality detection threshold value (for example, 20 km/h or higher), the system confidence degree calculation unit 26 recognizes that the measured vehicle speed is abnormal. The same is applied to the acceleration and the yaw rate.

The system confidence degree calculation unit 26 may calculate the system confidence degree from the result of comparison between the travel state of the vehicle planned in the travel plan and the travel state of the vehicle recognized as a result of performing the autonomous driving control, based on the travel state of the vehicle recognized by the travel state recognition unit 23 and the travel plan generated by the travel plan generation unit 24. For example, if a deviation between the vehicle speed planned in the travel plan and the history of the vehicle speed as a result of autonomous driving control is equal to or greater than a deviation threshold value, the system confidence degree calculation unit 26 may calculate the system confidence degree as a lower value compared to a case where the deviation is less than the deviation threshold value. The same is applied to the acceleration and the yaw rate.

In addition, when abnormalities are detected from various sensors (the external sensor, the internal sensor, and the like) of the vehicle, the system confidence degree calculation unit 26 may calculate the system confidence degree as a lower value compared to a case where various sensors are normal. Well-known abnormality detection technology can be used for detecting the abnormalities of the sensors.

The system confidence degree calculation unit 26 calculates (predicts) the system confidence degree corresponding to the position on the trajectory of the vehicle (a future position). The position on the trajectory of the vehicle is, for example, the position of the vehicle in the travel plan at a plurality of future times set in advance and separated by a predetermined time interval. The predetermined time interval may be, for example, 1 second or may be 0.5 second. The predetermined time interval may be shorter as the vehicle speed of the vehicle increases. The number of future times may be equal to or more than two.

Alternatively, the position on the trajectory of the vehicle may be a plurality of positions separated by a predetermined interval starting from the vehicle on the trajectory of the vehicle. The predetermined interval may be, for example, 10 m or may be 15 m. The number of positions for which the system confidence degree is calculated may be fixed or may be changed according to the vehicle speed of the vehicle. The number of positions for which the system confidence degree is calculated may increase as the vehicle speed of the vehicle increases.

The system confidence degree calculation unit 26 can calculate the future system confidence degree in the position on the trajectory of the vehicle by predicting the behavior of the moving object around the vehicle from the external environment of the vehicle. The system confidence degree calculation unit 26 estimates, for example, the number of moving objects around the vehicle for each position on the trajectory of the vehicle by predicting the behavior of the moving objects around the vehicle. If the estimated number of moving objects is equal to or greater than a certain number, the system confidence degree calculation unit 26 calculates the system confidence degree at that position as a lower value compared to a case when the estimated number of moving objects around the vehicle is less than the certain number.

The system confidence degree calculation unit 26 may determine whether or not there is a preceding vehicle within a certain distance from the vehicle for each position on the trajectory of the vehicle using the prediction of the behavior of another vehicle around the vehicle, and then, may calculate the system confidence degree for each position on the trajectory of the vehicle using the result determination of the presence or absence of the preceding vehicle. In addition, the system confidence degree calculation unit 26 may estimate a vehicle-to-vehicle distance between the vehicle and the preceding vehicle using the prediction of the behavior of the preceding vehicle in each position on the trajectory of the vehicle, and may calculate the system confidence degree for each position on the trajectory of the vehicle based on the result of estimation of the vehicle-to-vehicle distance between the vehicle and the preceding vehicle. The same can be applied to the calculation of the following vehicle and the vehicle traveling in parallel.

The system confidence degree calculation unit 26 may estimate the time to collision between the vehicle and the moving object for each position on the trajectory of the vehicle, and may use the time to collision for calculating the system confidence degree. In addition to the prediction of the behavior of the moving objects, the system confidence degree calculation unit 26 may predict the shielding ratio of the detection range of external sensor 2 for each position of the trajectory of the vehicle considering the map information including the position information of a stationary object, and may use the result of prediction for calculating the system confidence degree. The system confidence degree calculation unit 26 may calculate the system confidence degree for each position on the trajectory of the vehicle using at least one of the degree of interference of the moving object with the trajectory of the vehicle described above and the degree of danger of the moving object around the vehicle.

The system confidence degree calculation unit 26 may calculate the system confidence degree for each position on the trajectory of the vehicle based on the map information. The system confidence degree calculation unit 26 predicts the number of marking objects that can be recognized for each position on the trajectory of the vehicle based on, for example, the map information. If the number of marking objects that can be recognized at a certain position on the trajectory is less than a marking object threshold value, the system confidence degree calculation unit 26 may calculate the system confidence degree at that position as a lower value compared to a case when the number of marking objects is equal to or greater than the marking object threshold value. If the position on the trajectory of the vehicle is included in an area where the accuracy of the map information is low, the system confidence degree calculation unit 26 may calculate the system confidence degree at that position as a lower value compared to a case where the position is not included in the area where the accuracy of the map information is low. If the position on the trajectory of the vehicle is positioned in a complicated road environment, the same can be applied to the case where the position on the trajectory of the vehicle is positioned in an area having poor visibility.

The normal driving situation determination unit 27 determines whether or not the autonomous driving is in normal driving situation based on at least one of the position of the vehicle on the map, the external environment of the vehicle, the travel state of the vehicle, and the trajectory of the vehicle. The normal driving situation is a situation in which the autonomous driving is normally operated in the autonomous driving system 100. The fact that the autonomous driving is in a normal driving situation means that the autonomous driving of the vehicle is normally operated, and means a situation in which the autonomous driving is not suddenly terminated and the driving mode is not switched to the driver-based driving.

Specifically, the normal driving situation determination unit 27 determines whether or not the autonomous driving is in the normal driving situation based on the system confidence degree calculated from at least one of the position of the vehicle on the map, the external environment of the vehicle, the travel state of the vehicle, and the trajectory of the vehicle. For example, if the system confidence degree is equal to or higher than a normal driving threshold value, the normal driving situation determination unit 27 determines that the autonomous driving is in the normal driving situation. If the system confidence degree is lower than the normal driving threshold value, the normal driving situation determination unit 27 determines that the autonomous driving is not in the normal driving situation.

The normal driving situation determination unit 27 may determine whether or not the autonomous driving is in the normal driving situation without using the system confidence degree. For example, if the shielding ratio of the detection range of the external sensor 2 due to the buildings, other vehicles, or the like is equal to or greater than the shielding threshold value, the normal driving situation determination unit 27 may determine that the autonomous driving is not in the normal driving situation. In a sensor abnormality of at least one of the external sensor 2 and the internal sensor 3 is detected, the normal driving situation determination unit 27 may determine that the autonomous driving is not in the normal driving situation.

The normal driving situation determination unit 27 may determine whether or not the autonomous driving is in the normal driving situation based on an accuracy of recognition of the position on the vehicle on the map performed by the vehicle position recognition unit 21. The normal driving situation determination unit 27 obtains the accuracy of recognition of the position of the vehicle on the map from the number of the recognized marking objects positioned around the vehicle and/or the arrangement of the marking objects around the vehicle. If the accuracy of recognition is lower than a recognition accuracy threshold value, the normal driving situation determination unit 27 determines that the autonomous driving is not in the normal driving situation.

The normal driving situation determination unit 27 may determine whether or not the autonomous driving is in the normal driving situation based on the trajectory generated by the trajectory generation unit 24. For example, if a deviation width (distortion width) in the right and left direction of the trajectory within a certain distance is equal to or more than a deviation width threshold value, the normal driving situation determination unit 27 determines that the autonomous driving is not in the normal driving situation. If a difference between the upper limit speed and the lower limit speed in the trajectory within a certain distance is equal to or higher than a speed difference threshold value, the normal driving situation determination unit 27 may determine that the autonomous driving is not in the normal driving situation.

In addition, the normal driving situation determination unit 27 may calculate a traveling safety degree of the trajectory generated by the trajectory generation unit 24 using trajectory evaluation method disclosed in JP-A-2009-157502. In this case, for example, if the traveling safety degree of the trajectory adopted for the autonomous driving is lower than a traveling safety degree threshold value, the normal driving situation determination unit 27 can determine that the autonomous driving is not in the normal driving situation.

The normal driving situation determination unit 27 may determine whether or not the autonomous driving is in the normal driving situation by combining multiple criteria such as the shielding ratio of the detection range of external sensor 2 described above, the accuracy of recognition of the position of the vehicle on the map, the trajectory, and like, in addition to the system confidence degree. If it is determined that the autonomous driving is not in the normal driving situation based on any one of the criteria, the normal driving situation determination unit 27 may determine that the autonomous driving is not in the normal driving situation regardless of the result of determination based on other criteria.

The driver situation recognition unit 28 recognizes a driver situation during the autonomous driving. The result of recognition of the driver situation is used in determination of the overconfidence by the overconfidence determination unit 29 described later. The driver situation includes at least one of a reaction delay time of the driver against a change of the external environment of the vehicle, a warning reaction delay time of the driver against the warning, and a driver's non-driving action time. The driver situation recognition unit 28 recognizes the driver situation based on at least one of the driver's operation detected by the driving operation detection unit 5 and the driver image captured by the driver monitor camera 6.

First, the reaction delay time of the driver against the changes in the external environment of the vehicle will be described. The changes in the external environment of the vehicle mean the changes in the external environment to which the driver takes reaction. The changes in the external environment of the vehicle includes at least one of the following: an interruption of another vehicle ahead of the vehicle, jumping out of the pedestrian ahead of the vehicle, an overtaking of the another vehicle beside the vehicle, a rapid deceleration of the preceding vehicle, and the like. The driver situation recognition unit 28 recognizes that the changes in the external environment of the vehicle have occurred based on the external environment of the vehicle recognized by the external environment recognition unit 22.

The driver situation recognition unit 28 may distinguish and recognize the types of changes in the external environment of the vehicle. In this case, the interruption of the another vehicle ahead of the vehicle, the jumping out of the pedestrian ahead of the vehicle, the overtaking of the another vehicle beside the vehicle, and the rapid deceleration of the preceding vehicle can respectively be recognized as another type of changes of the external environment. The jumping out of moving objects such as a bicycle, a personal mobility, or another vehicle may be applied as the same type as the jumping out of the pedestrian.

The reaction delay time of the driver is a delay time from the occurrence of the changes in the external environment of the vehicle to the reaction of the driver. For example, if the driver is in a driving posture in which the driver grips the steering portion of the vehicle with his/her both hands while the face is facing in front of the vehicle, the driver situation recognition unit 28 detects that the driver takes the reaction against the changes in the external environment of the vehicle. The driver situation recognition unit 28 may detect that the driver takes the reaction when the driver turns his/her face forward regardless of the situation of the driver's hand. Alternatively, the driver situation recognition unit 28 may detect that the driver takes the reaction when the driver grips the steering portion with his/her both hands without recognizing the orientation of the driver's face.

In addition, the driver situation recognition unit 28 may detect that the driver takes the reaction when the driver moves the face so as to check the surroundings of the vehicle. When the brake sensor detects that the driver puts his/her foot on the brake pedal or when the accelerator sensor detects that the driver puts his/her foot on the accelerator pedal, the driver situation recognition unit 28 may detect that the driver takes the reaction.

If it is determined that the driver visually recognizes the changes in the external environment of the vehicle, the driver situation recognition unit 28 may detect that the driver takes the reaction. For example, if the changes in the external environment of the vehicle is another vehicle's overtaking, the driver situation recognition unit 28 detects that the driver takes the reaction against the overtaking of other vehicle when the driver turns his/her face toward the other vehicle. If the reaction delay time of the driver against the changes in the external environment of the vehicle is recognized, the warning to the driver that will be described later is not performed. In addition, the driver situation recognition unit 28 may recognize driver's biometric information through the communication with the wearable device attached to the driver through the in-vehicle communication unit 8.

Next, the warning reaction delay time of the driver against the warning will be described. The warning is, for example, a warning to the driver to pay attention to the changes in the external environment of the vehicle. The changes in the external environment of the vehicle in this case can also include at least one of the interruption of another vehicle ahead of the vehicle, the jumping out of the pedestrian ahead of the vehicle, the overtaking of the another vehicle beside the vehicle, and the rapid deceleration of the preceding vehicle. The changes in the external environment of the vehicle mean the changes in the external environment to which the driver takes reaction and the changes in the external environment of the vehicle subject to the warning do not necessarily need to match each other. For example, if the interruption of another vehicle ahead of the vehicle is recognized, the autonomous driving system 100 performs the warning to the driver to pay an attention. The content of the warning will be described later.

The warning reaction delay time of the driver is a delay time from the output of the warning to the time of driver's reaction. The driver's reaction can be recognized in the same manner as the reaction delay time of the driver described above. If the warning is an image display, the driver situation recognition unit 28 may detect that the driver takes the reaction when the driver turns the face in the direction where the image is displayed. If the warning is an audio output, the driver situation recognition unit 28 may detect that the driver takes the reaction when the driver turns the face in the direction where the audio is output. The driver situation recognition unit 28 recognizes the time from the warning output to the time of recognition of the driver's reaction as the warning reaction delay time of the driver against the warning.

Next, the driver's non-driving action time will be described. The driver's non-driving action time is a time during which the driver is performing non-driving action. The non-driving action is an action that is not related to a driving action. The driving action includes an action in which the driver grips the steering portion of the vehicle and an action in which the driver monitors the vehicle ahead, and the like. The non-driving action includes looking aside, an operation of a smartphone, an operation of a vehicle facility (for example, an audio facility or a navigation system).

The driver situation recognition unit 28 recognizes the non-driving action time by detecting the non-driving action of the driver based on, for example, the driver image captured by the driver monitor camera 6. If the in-vehicle communication unit 8 is communicating with the driver's smartphone, the driver situation recognition unit 28 may detect the non-driving action of the driver from the operation information of the driver's smartphone. The driver situation recognition unit 28 may detect the non-driving action of the driver using both the operation information of the driver's smartphone and the driver image captured by the driver monitor camera 6.

The driver situation recognition unit 28 may detect the non-driving action of the driver from the operation information of the vehicle facility. If it is determined that the driver is concentrating on the conversation based on the result of recognition performed by the voice recognition unit 7, the driver situation recognition unit 28 may detect such a situation as the non-driving action of the driver. The fact that the driver is concentrating on the conversation is a state in which, for example, the driver is speaking continuously with a voice of a certain volume or higher. The voice of the driver may be registered in advance in the voice recognition unit 7. The driver situation recognition unit 28 may determine whether or not the driver is concentrating on the conversation by combining the driver image captured by the driver monitor camera 6 and the result of recognition performed by the voice recognition unit 7.

The driver situation recognition unit 28 may detect the driving action of the driver based on at least one of the driver's operation detected by the driving operation detection unit 5 and the driver image captured by the driver monitor camera 6. For example, if the driver is in a driving posture in which the steering portion of the vehicle is gripped with both hands while the face is facing in front of the vehicle, the driver situation recognition unit 28 detects that the driver is performing a driving behavior. The driver situation recognition unit 28 recognizes the time during which the driving action of the driver is detected, as the driving action time. The driver situation recognition unit 28 does not necessarily need to detect the driving action.

The overconfidence determination unit 29 determines whether or not the driver is in the system overconfidence state based on the result of recognition performed by the driver situation recognition unit 28. The system overconfidence state is a state in which the driver has an overconfidence in the autonomous driving by the autonomous driving system 100. It is considered that the driver in the system overconfidence state does not pay enough attention to the surroundings of the vehicle despite that the enough attention should be paid even during the autonomous driving.

Specifically, the overconfidence determination unit 29 determines whether or not the driver is in the system overconfidence state based on a result of comparison between the reaction delay time of the driver against the changes in the external environment of the vehicle and the warning reaction delay time of the driver. It is considered that the driver in the system overconfidence state is neglecting to pay attention to the external environment of the vehicle, relying on the warning from the autonomous driving system 100. Therefore, by comparing the reaction delay time of the driver against the changes in the external environment of the vehicle and the warning reaction delay time of the driver, it is possible to determine whether or not the driver is in the system overconfidence state.

In this case, first, if the driver situation recognition unit 28 recognizes the warning reaction delay time of the driver against the warning corresponding to the changes in the external environment of the vehicle, the overconfidence determination unit 29 stores the warning reaction delay time of the driver as a reference reaction delay time. The overconfidence determination unit 29 may store the reference reaction delay time in a storage device connected to the ECU 20.

Thereafter, if the driver situation recognition unit 28 recognizes the reaction delay time of the driver against the changes in the external environment of the vehicle, the overconfidence determination unit 29 calculates a difference obtained by subtracting the reference reaction delay time (stored warning reaction delay time) from that reaction delay time. If the difference between the reaction delay time and the reference reaction delay time is equal to or greater than the overconfidence threshold value, the overconfidence determination unit 29 determines that the driver is in the system overconfidence state. The overconfidence threshold value is a threshold value having a positive value. The overconfidence threshold value may be changed in accordance with various parameters such as the speed of the vehicle or the brightness outside the vehicle.

The overconfidence determination unit 29 may distinguish the types of changes in the external environment of the vehicle. The overconfidence determination unit 29 stores the warning reaction delay time of the driver for each type of the interruption of another vehicle ahead of the vehicle, the jumping out of the pedestrian ahead of the vehicle, the overtaking of the another vehicle beside the vehicle, the rapid deceleration of the preceding vehicle, and the like. If the driver situation recognition unit 28 recognizes the reaction delay time of the driver against the changes in the external environment of the vehicle, the overconfidence determination unit 29 determines whether or not the driver is in the system overconfidence state by comparing the recognized reaction delay time of the driver with the warning reaction delay time corresponding to the type of change of the external environment.

The overconfidence determination unit 29 does not necessarily need to perform the comparison between the reaction delay time of the driver and the warning reaction delay time of the driver. The overconfidence determination unit 29 may determine whether or not the driver is in the system overconfidence state based on the reaction delay time of the driver against the changes in the external environment of the vehicle.

Specifically, the overconfidence determination unit 29 stores the reaction delay time for the comparison for each type of the changes in the external environment of the vehicle. If the reaction delay time of the driver against the changes in the external environment of the vehicle is recognized, the overconfidence determination unit 29 calculates a difference obtained by subtracting the reaction delay time for comparison corresponding to the type of change of the external environment from the reaction delay time of the driver. If the difference between the reaction delay time of the driver and the reaction delay time for comparison is equal to or greater than the overconfidence threshold value, the overconfidence determination unit 29 may determine that the driver is in the system overconfidence state.

Similarly, the overconfidence determination unit 29 may determine whether or not the driver is in the system overconfidence state based on the warning reaction delay time of the driver against the warning corresponding to the changes in the external environment of the vehicle. The overconfidence determination unit 29 stores the warning reaction delay time for comparison in advance. If the warning reaction delay time of the driver is recognized, the overconfidence determination unit 29 calculates a difference obtained by subtracting the warning reaction delay time for comparison from the warning reaction delay time of the driver. If the difference between the warning reaction delay time of the driver and the warning reaction delay time for comparison is equal to or greater than the overconfidence threshold value, the overconfidence determination unit 29 may determine that the driver is in the system overconfidence state. The overconfidence determination unit 29 may use the warning reaction delay time for comparison having different values depending on the type of changes in the external environment of the vehicle.

Figure 2:
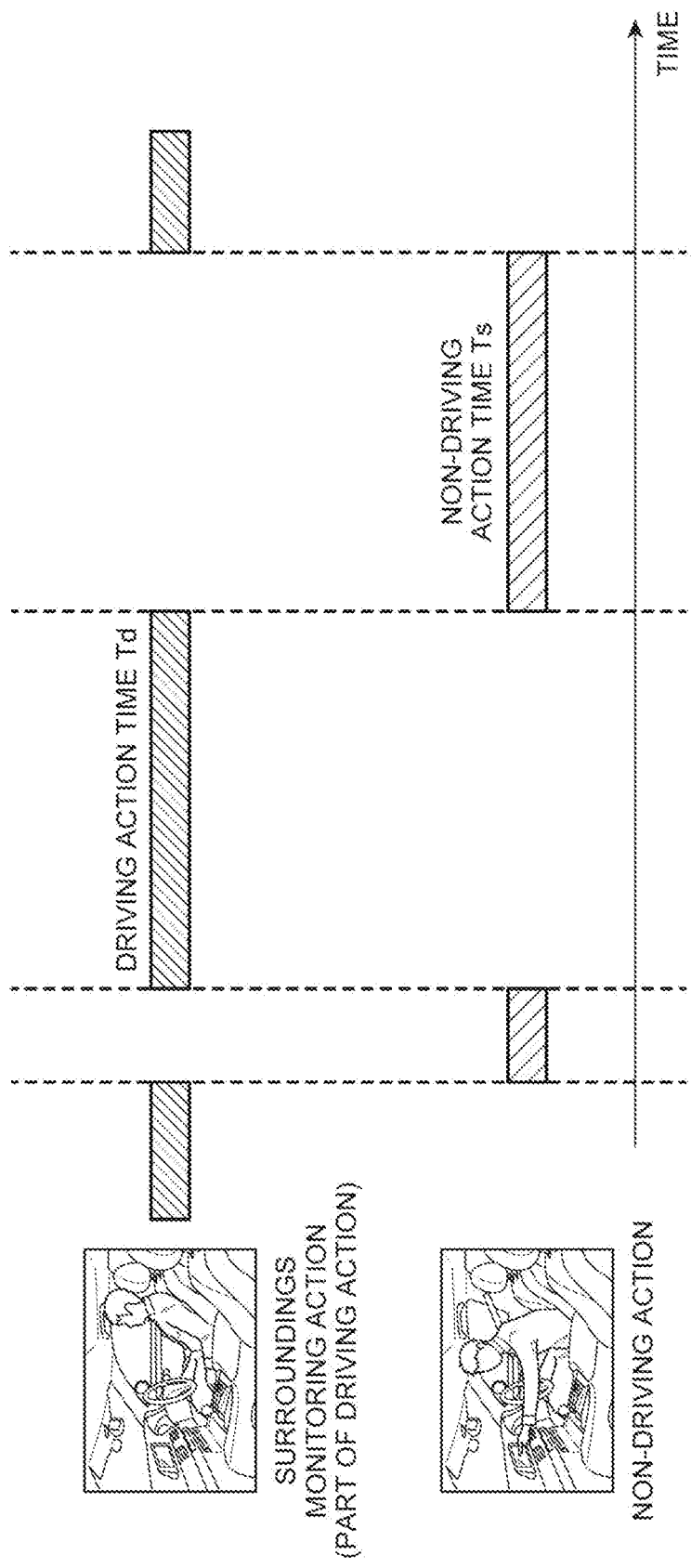
FIG. 2 is a diagram for explaining a non-driving action time.

The overconfidence determination unit 29 may determine whether or not the driver is in the system overconfidence state based on the driver's non-driving action time. Here, FIG. 2 is a diagram for explaining the non-driving action time. A driving action time Td and a non-driving action time Ts are illustrated in FIG. 2. In FIG. 2, when a driver's driving action is detected, the driver situation recognition unit 28 recognizes the time of driver's driving action as the driving action time Td. A surroundings monitoring action is a part of the driving action. If the driver's non-driving action is detected, the driver situation recognition unit 28 recognizes the time of driver's non-driving action as the non-driving action time Ts.

As illustrated in FIG. 2, the driver's action during the autonomous driving can be divided into the driving action and the non-driving action. In the driver in the system overconfidence state, since it is considered that the non-driving action time Ts increases, it is possible to determine whether or not the driver is in the system overconfidence state based on the non-driving action time Ts.

For example, if a length of the consecutive non-driving action time Ts becomes equal to or longer than an overconfidence time threshold value, the overconfidence determination unit 29 determines that the driver is in the system overconfidence state. Alternatively, if a ratio of non-driving action time Ts to the driving action time Td is equal to or greater than a ratio threshold value, the overconfidence determination unit 29 determines that the driver is in the system overconfidence state. In addition, if a ratio of the non-driving action time Ts to a certain period of time is equal to or greater than a ratio threshold value, the overconfidence determination unit 29 determines that the driver is in the system overconfidence state.

The overconfidence determination unit 29 may output a voice message from a speaker 10b for checking the driver's reaction when the normal driving situation determination unit 27 determines that the autonomous driving is in the normal driving situation. The overconfidence determination unit 29 outputs, for example, a voice message such as "Please return to the driving posture" to the driver.

If the driver's reaction (the reaction such as turning the face to the sound output direction or gripping a steering portion) is not detected even though the voice message is output, the overconfidence determination unit 29 may determine that the driver is in the system overconfidence state. The voice message can have, for example, such a low volume as not to be mixed with the background sound. In addition, the voice message may be output from the speaker 10b in the direction in which the driver's face is not facing. Instead of the voice message, an image display of a message may be used.

In addition, the overconfidence determination unit 29 may determine the system overconfidence state based on the biometric information of the driver recognized by the driver situation recognition unit 28. The overconfidence determination unit 29 may determine the system overconfidence state by using the biometric information of the driver in combination with the reaction delay time of the driver or the like. If an armrest sensor that measures the weight of the driver's arm is provided on the armrest of the driver's seat, the overconfidence determination unit 29 may determine the system overconfidence state using the result of measurement performed by the armrest sensor in combination with the reaction delay time of the driver and the like. When the driver is leaning on the armrest, it can be considered that the driver is more likely to be in the system overconfidence state than when the driver does not lean on the armrest.

The anxiety elicitation situation determination unit 30 determines, whether or not the vehicle in the autonomous driving is in an anxiety elicitation situation. The anxiety elicitation situation is a situation of the vehicle that causes an anxiety to the driver of the vehicle. The anxiety elicitation situation is determined from the driver's point of view. An example of the anxiety elicitation situation includes a situation in which the vehicle and the other vehicle are close to each other by the other vehicle is trying to interrupt ahead the vehicle within the driver's field of view.

For example, if an area of a moving object in a captured image is equal to or greater than an anxiety elicitation threshold value, the anxiety elicitation situation determination unit 30 determines that the vehicle in the autonomous driving is in the anxiety elicitation situation based on the image captured by the camera that images ahead of the vehicle. The area of the moving object is an area occupied by other vehicles, pedestrians, moving objects such as bicycles (movable obstacles), and the like in the captured image. The anxiety elicitation situation determination unit 30 can determine the anxiety elicitation situation based on the area of the moving object from a fact that the driver is likely to be more anxious about the situation of the vehicle as the area of the moving object that occupies the field of view of the driver increases.

Figure 3:
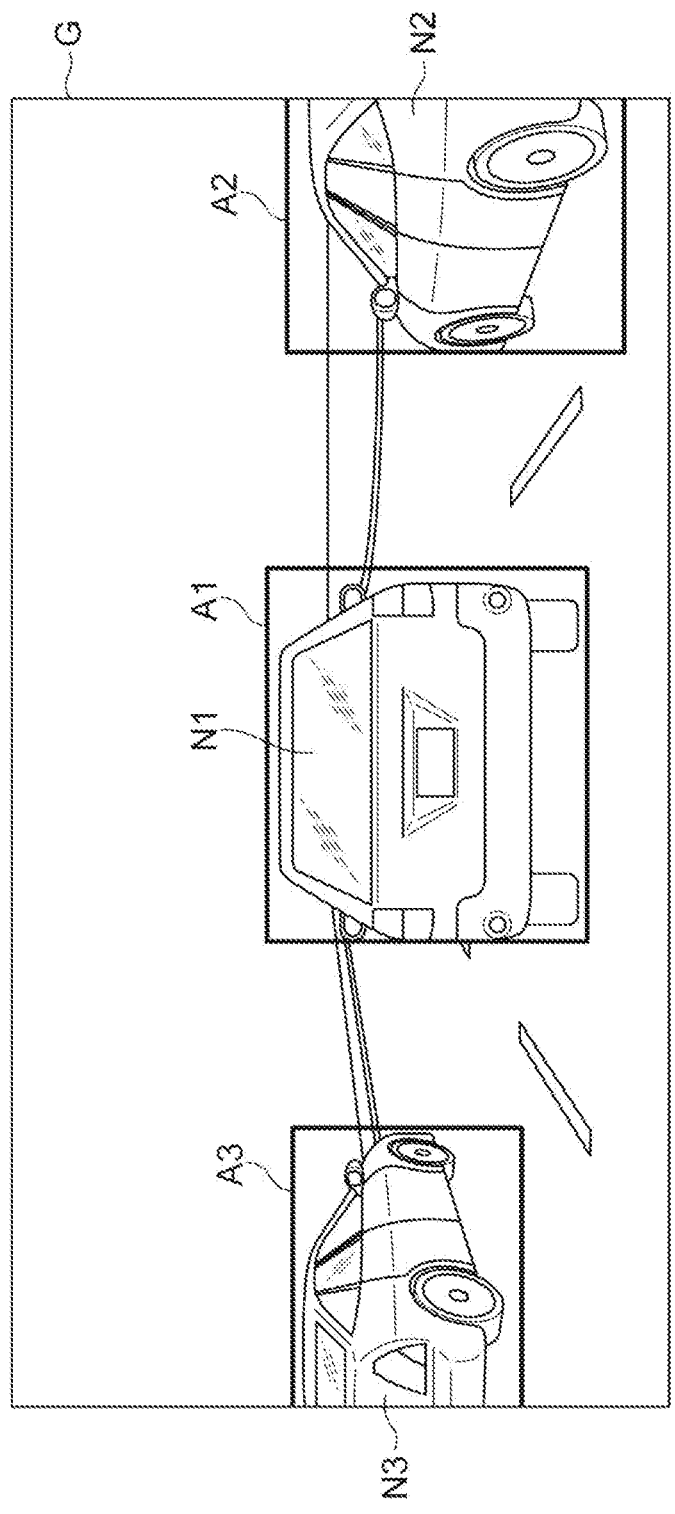
FIG. 3 is a diagram for explaining an example of an anxiety elicitation situation.

Here, FIG. 3 is a diagram for explaining an example of the anxiety elicitation situation. FIG. 3 illustrates an image captured by a camera G, a preceding vehicle N1, a right side other vehicle N2, and a left side other vehicle N3. Furthermore, FIG. 3 illustrates an image area A1 of the preceding vehicle N1, an image area A2 of the right side other vehicle N2, and an image area A3 of the left side other vehicle N3. The area of the moving object is the total area of the image areas A1 to A3.

In the situation in FIG. 3, the anxiety elicitation situation determination unit 30 recognizes an area of the moving object (total area of the image areas A1 to A3) in the image captured by the camera G based on the external environment of the vehicle recognized by the external environment recognition unit 22. If the area of the moving object is equal to or greater than the anxiety elicitation threshold value, the anxiety elicitation situation determination unit 30 determines that the vehicle is in the anxiety elicitation situation. The anxiety elicitation threshold value may be changed in accordance with various parameters such as at least one of the speed of the vehicle and the brightness outside the vehicle. Well-known image recognition technology may be used to recognize the area of the moving object in the captured image.

The anxiety elicitation situation determination unit 30 may determine that the vehicle is in the anxiety elicitation situation when the area of the moving object suddenly increases. For example, if the increase in the area of the moving object within a certain time is equal to or greater than an area increase threshold value, the anxiety elicitation situation determination unit 30 determines that the vehicle is in the anxiety elicitation situation.

In addition, the anxiety elicitation situation determination unit 30 may consider not only the image captured by the camera that images ahead of the vehicle but also the area of the moving object in the image captured by a camera that images at least one of the side or rear of the vehicle. For example, if the area of the moving object, which is the sum of the image areas of the moving objects captured by all the cameras that images the outside of the vehicle, is equal to or greater than the anxiety elicitation threshold value, the anxiety elicitation situation determination unit 30 may determine that the vehicle in the autonomous driving is in the anxiety elicitation situation.

The anxiety elicitation situation determination unit 30 does not necessarily need to determine the anxiety elicitation situation based on the area of the moving object. The anxiety elicitation situation determination unit 30 may determine the anxiety elicitation situation while considering the density of other vehicles around the vehicle, types of other vehicles around the vehicle, and a sound around the vehicle. As an example, an anxiety elicitation degree can be used. If the anxiety elicitation degree is equal to or higher than an anxiety elicitation degree threshold value, the anxiety elicitation situation determination unit 30 determines that the vehicle is in the anxiety elicitation situation.

The anxiety elicitation situation determination unit 30 calculates the anxiety elicitation degree as a larger value when the type of other vehicle positioned within a certain distance from the vehicle is a small vehicle is a large vehicle such as a truck compared to a case when the type of other vehicle, for example. The anxiety elicitation situation determination unit 30 may calculate the anxiety elicitation degree as a larger value when the type of other vehicle positioned within a certain distance from the vehicle is a wide car such as a luxury car compared to a case when the type of other vehicle is a small car.

The anxiety elicitation situation determination unit 30 may calculate the anxiety elicitation degree as a larger value when the type of other vehicle positioned within a certain distance from the vehicle is a small vehicle is a motorcycle compared to a case when the type of other vehicle. The anxiety elicitation situation determination unit 30 may calculate the anxiety elicitation degree as a larger value as the number of other vehicles present within a certain distance from the vehicle increases. The anxiety elicitation situation determination unit 30 may calculate the anxiety elicitation degree as a larger value as a noise level (for example, decibel) of the sound around the vehicle is higher. The anxiety elicitation situation determination unit 30 may calculate the anxiety elicitation degree as a larger value when the sound of large vehicle approaching is detected compared to a case when the sound of large vehicle approaching is not detected. The anxiety elicitation situation determination unit 30 may calculate the anxiety elicitation degree as a larger value when a siren sound of a special vehicle such as an emergency vehicle or a police vehicle is detected compared to a case when the siren sound of the special vehicle is not detected. The anxiety elicitation situation determination unit 30 may calculate the anxiety elicitation degree as a larger value when there is a sound whose noise level is higher than a noise threshold value even if the sound is from a construction site or the like, compared to a case when there is no sound whose noise level is higher than the noise threshold value.

In addition, the anxiety elicitation situation determination unit 30 may determine the anxiety elicitation situation by collating the external environment of the vehicle with data in a determination database prepared in advance. In the determination database, for example, the external environment of the vehicle that is to be used for the determination of the anxiety elicitation situation is stored as data. For example, when the external environment (the image captured by the camera of the vehicle, the arrangement of other vehicles around the vehicle detected by the radar sensor, and the like) matches the data in the determination database, the anxiety elicitation situation determination unit 30 determines that the vehicle is in the anxiety elicitation situation. The method for generating the determination database is not particularly limited.

The warning control unit 31 performs various warnings to the driver during the autonomous driving. The warning control unit 31 performs various warnings by transmitting various control signals to the HMI 10. The warning is performed by at least one of the image display on the display 10a, the audio output from the speaker 10b, and the output of the vibration by the vibrator 10c of the HMI 10. The warning may be performed by combining two or more of the image display, the audio output, and the vibration.

For example, if the system confidence degree decreases and it becomes necessary to switch the driving mode from the autonomous driving to the driver-based driving, the warning control unit 31 performs warning for the driver to switch the driving mode to the driver-based driving. When the interruption of another vehicle ahead of the vehicle is recognized, the warning control unit 31 may perform the warning to the driver to pay an attention. When it is required for the vehicle in autonomous driving to decelerate by more than a certain amount or to avoid the preceding vehicle due to the rapid deceleration of the preceding vehicle, and the like, the warning control unit 31 may perform the warning to the driver to pay an attention.

The warning control unit 31 outputs an alert under certain conditions. Specifically, when it is determined by the normal driving situation determination unit 27 that the autonomous driving is in the normal driving situation, when it is determined by the overconfidence determination unit 29 that the driver is in the system overconfidence state, and when it is determined by the anxiety elicitation situation determination unit 30 that the vehicle in the autonomous driving is not in the anxiety elicitation situation, the warning control unit 31 outputs the alert.

The alert is for alerting the driver to eliminate the system overconfidence state. The alert is not an alert for the driver to pay attention to the external environment or the like. The content of the alert is not limited as long as the alert contributes to eliminate the driver's system overconfidence state as much as possible. The alert may be referred to as a dummy alert in a sense that it differs from a usual warning. In the content of the alert, if a lane departure during the autonomous driving is assigned as the warning by the vibration of the steering portion (vibration of the steering wheel), the content of alert that is not assigned as the warning in the autonomous driving may be adopted.

The alert includes at least one of the alert by the display, the alert by the sound, and the alert by the vibration. The alert may be performed by combining two or more of the alert by the display, the alert by the sound, and the alert by the vibration.

The alert by the display includes the image display by the display 10a of the HMI 10. The display alert may be a projection display on the windshield of the vehicle using a head-up display. The alert by display may be an image display on a multi-information display, or an image display on a blind spot monitor provided on a side mirror of the vehicle. The alert by the display may include an image display on a screen such as a driver's smartphone communicating with the vehicle via the in-vehicle communication unit 8. The display content may be icon display or text display. The display content is not limited as long as the content can contribute to the elimination of the driver's system overconfidence state.

The alert by the sound includes a voice output from the speaker 10b. The alert by the sound includes at least one of the alarm sound and the voice. The alarm sound may be a continuous sound or an intermittent sound. The type and the content of the voice are not limited as long as voice can contribute to the elimination of the driver's system overconfidence state.

The alert by the vibration includes the output of vibration from the vibrator 10c. The alert by the vibration includes at least one of a steering portion vibration, a driver's seat vibration, a driver's headrest vibration, a driver's armrest vibration, an accelerator pedal vibration, and a brake pedal vibration.

If it is determined by the normal driving situation determination unit 27 that the autonomous driving is not in the normal driving situation, or if it is determined by the overconfidence determination unit 29 that the driver is not in the system overconfidence state, the warning control unit 31 does not output the alert.

In addition, even if it is determined by the normal driving situation determination unit 27 that the autonomous driving is in the normal driving situation and it is determined by the overconfidence determination unit 29 that the driver is in the system overconfidence state, the warning control unit 31 does not output the alert when it is determined by the anxiety elicitation situation determination unit 30 that the vehicle in the autonomous driving is in the anxiety elicitation situation. In this case, the warning control unit 31 may be configured not to perform even the usual warning other than the alert.

Processing by Autonomous Driving System in First Embodiment

Next, the processing by autonomous driving system 100 in the first embodiment will be described with reference to the drawings.

Autonomous Driving Processing

Figure 4:
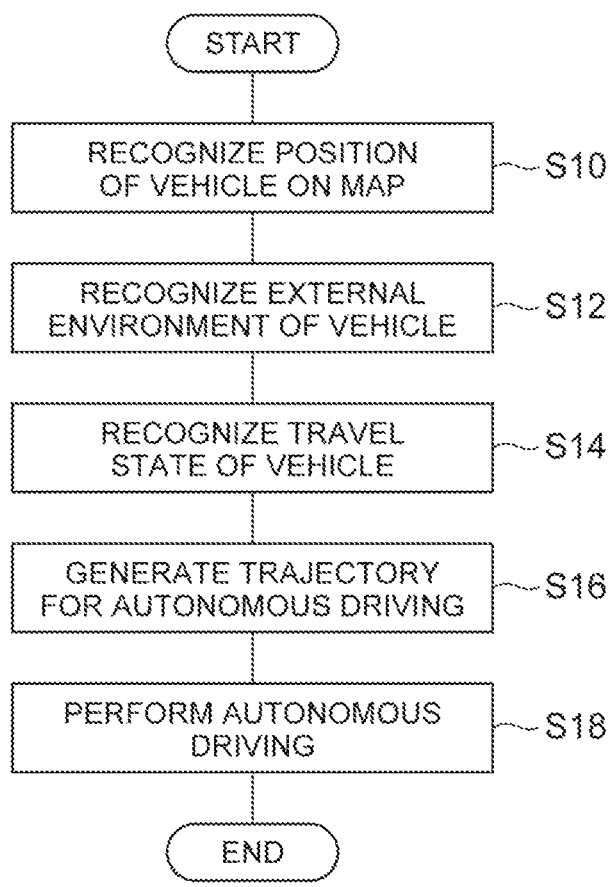
FIG. 4 is a flowchart illustrating an example of autonomous driving processing.

FIG. 4 is a flowchart illustrating an example of the autonomous driving processing. The autonomous driving processing illustrated in FIG. 4 is performed when the autonomous driving of the vehicle is started.

As illustrated in FIG. 4, as S10, the ECU 20 of the autonomous driving system 100 recognizes the position of the vehicle on the map using the vehicle position recognition unit 21. The vehicle position recognition unit 21 recognizes the position of the vehicle on the map based on the position information from the GPS receiver 1 and the map information in the map database 4. In addition, the vehicle position recognition unit 21 may estimate the position of the vehicle on the map using SLAM technology or the like.

In S12, the ECU 20 recognizes the external environment of the vehicle using the external environment recognition unit 22. The external environment recognition unit 22 recognizes the external environment of the vehicle based on the result of detection performed by the external sensor 2.

In S14, the ECU 20 recognizes the travel state of the vehicle using the travel state recognition unit 23. The travel state recognition unit 23 recognizes the state of the traveling vehicle based on the result of detection performed by the internal sensor 3.

In S16, the ECU 20 generates a trajectory for the autonomous driving using the trajectory generation unit 24. The trajectory generation unit 24 generates the trajectory of the autonomous driving based on a destination set in advance, map information, the position of the vehicle on the map, the external environment of the vehicle, and the travel state of the vehicle.

In S18, the ECU 20 performs the autonomous driving using the vehicle control unit 25. The vehicle control unit 25 performs the autonomous driving of the vehicle based on the map information, the position of the vehicle on the map, the external environment of the vehicle, the travel state of the vehicle, and the trajectory.

Alert Output Processing

Figure 5:
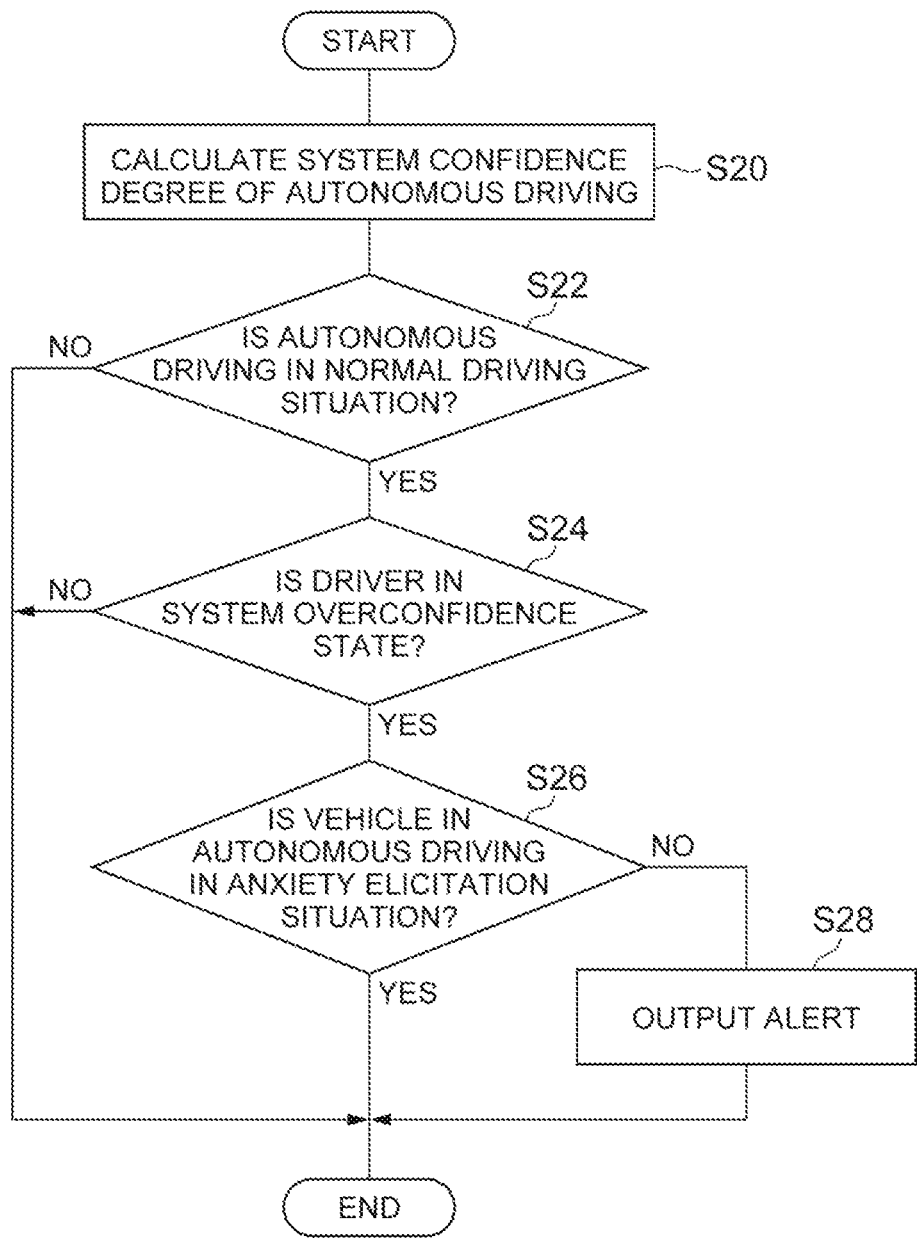
FIG. 5 is a flowchart illustrating an example of alert output processing.

FIG. 5 is a flowchart illustrating an example of the alert output processing. The alert output processing illustrated in FIG. 5 is performed during the autonomous driving of the vehicle. The alert output processing may be started after a certain period of time has elapsed or after traveling a certain distance since the autonomous driving of the vehicle is started.

As illustrated in FIG. 5, as S20, the ECU 20 calculates the system confidence degree of the autonomous driving using the system confidence degree calculation unit 26. The system confidence degree calculation unit 26 calculates the system confidence degree based on at least one of the position of the vehicle on the map, the external environment of the vehicle, the travel state of the vehicle, and the trajectory of the vehicle.

In S22, the ECU 20 determines whether or not the autonomous driving is in the normal driving situation using the normal driving situation determination unit 27. The normal driving situation determination unit 27 determines whether or not the autonomous driving is in the normal driving situation based on at least one of the position of the vehicle on the map, the external environment of the vehicle, the travel state of the vehicle, and the trajectory of the vehicle. If it is determined that the autonomous driving is in the normal driving situation (YES in S22), the ECU 20 makes the process proceed to S24. If it is determined that the autonomous driving is not in the normal driving situation (NO in S22), the ECU 20 ends the current processing. Thereafter, when the autonomous driving is continued, the ECU 20 repeats the processing from S20 again after a predetermined time has elapsed.

In S24, the ECU 20 determines whether or not the driver is in the system overconfidence state using the overconfidence determination unit 29. The overconfidence determination unit 29 whether or not the driver is in the system overconfidence state based on at least one of the reaction delay time of the driver against the changes in the external environment of the vehicle, the warning reaction delay time of the driver against the warning, and the driver's non-driving action time. Details of the system overconfidence state determination processing will be described later.

If it is determined that the driver is in the system overconfidence state (YES in S24), the ECU 20 makes the process proceed to S26. If it is determined that the driver is not in the system overconfidence state (NO in S24), the ECU 20 ends the current processing. Thereafter, when the autonomous driving is continued, the ECU 20 repeats the processing from S20 again after a predetermined time has elapsed.

In S26, the ECU 20 determines whether or not the vehicle in the autonomous driving is in the anxiety elicitation situation using the anxiety elicitation situation determination unit 30. For example, based on the image captured by the camera that captures ahead of the vehicle, if the area of the moving object in the captured image is greater than the anxiety elicitation threshold value, the anxiety elicitation situation determination unit 30 determines that the vehicle in the autonomous driving is in the anxiety elicitation situation. The details of the anxiety elicitation situation determination processing will be described later.

If it is determined that the vehicle in autonomous driving is in the anxiety elicitation situation (YES in S26), the ECU 20 ends the current processing. That is, The ECU 20 does not output the alert when it is determined that the vehicle in the autonomous driving is in the anxiety elicitation situation. Thereafter, when the autonomous driving is continued, the ECU 20 repeats the processing from S20 again after a predetermined time has elapsed. If it is determined that the vehicle in the autonomous driving is not in the anxiety elicitation situation (NO in S26), the ECU 20 makes the process proceed to S28.

In S28, the ECU 20 outputs the alert using the warning control unit 31. The warning control unit 31 outputs the alert by transmitting a control signal to the HMI 10. Thereafter, the ECU 20 ends the current processing. The ECU 20 repeats the processing from S20 again after a predetermined standby time has elapsed.

Reference Reaction Delay Time Storage Processing

Figure 6:
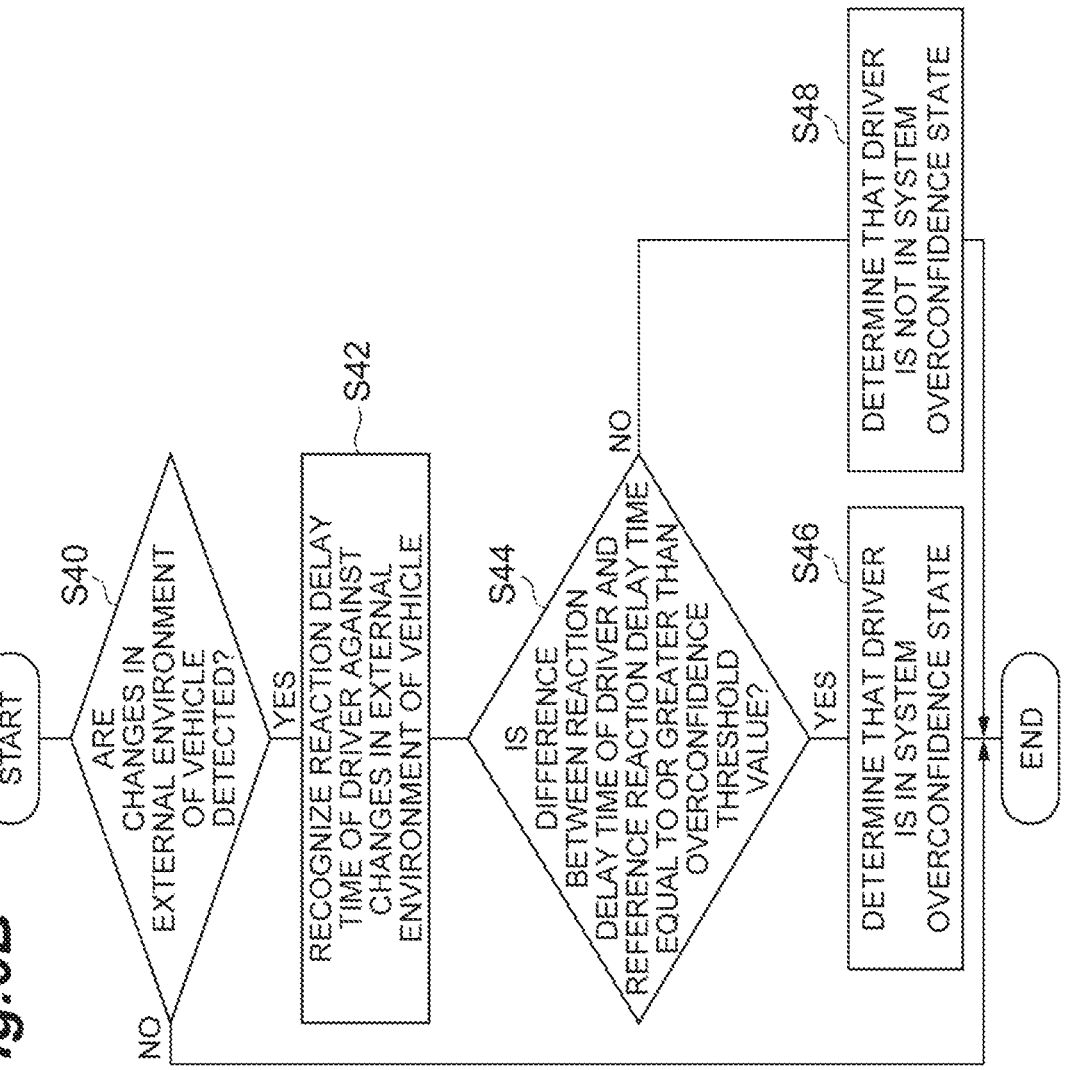
FIG. 6A is a flowchart illustrating an example of reference reaction delay time storage processing.
FIG. 6B is a flowchart illustrating an example of system overconfidence state determination processing.

FIG. 6A is a flowchart illustrating an example of the reference reaction delay time storage processing. The reference reaction delay time storage processing is the premise processing of the system over confidence status determination processing described later. The reference reaction delay time storage processing is performed during autonomous driving of the vehicle.

As illustrated in FIG. 6A, as S30, the ECU 20 determines whether or not the warning is performed using the warning control unit 31. The warning control unit 31 performs the warning on the driver by transmitting a control signal to the HMI 10. The warning to be determined may be limited to the warning about the changes in the external environment of the vehicle. If the warning is performed (YES in S30), the ECU 20 makes the process proceed to S32. If the warning is not performed (NO in S30), the ECU 20 ends the current processing. Thereafter, when the autonomous driving is continued, the ECU 20 repeats the processing from S30 again after a predetermined time has elapsed.

In S32, the ECU 20 recognizes the warning reaction delay time of the driver against the warning using the driver situation recognition unit 28. The driver situation recognition unit 28 recognizes the time from the warning output to the time the driver's reaction is recognized as the warning reaction delay time of the driver against the warning.

In S34, the ECU 20 stores the warning reaction delay time of the driver as a reference reaction delay time using the overconfidence determination unit 29. The overconfidence determination unit 29 may store the reference reaction delay time in a storage device connected to the ECU 20. Thereafter, the ECU 20 ends the current processing. The ECU 20 may update the reference reaction delay time by repeating the processing from S30 again after a predetermined waiting time has elapsed.

System Overconfidence State Determination Processing

FIG. 6B is a flowchart illustrating an example of the system over confidence status determination processing. The system over confidence status determination processing corresponds to the processing in S24 illustrated in FIG. 5.

As illustrated in FIG. 6B, as S40, the ECU 20 detects the changes in the external environment of the vehicle using the external environment recognition unit 22. The external environment recognition unit 22 detects the changes in the external environment of the vehicle based on the result of detection performed by the external sensor 2. If the changes in the external environment of the vehicle are detected (YES in S40), the ECU 20 makes the process proceed to S42. If the changes in the external environment of the vehicle are not detected (NO in S40), the ECU 20 ends the current processing. Thereafter, when the autonomous driving is continued, the ECU 20 repeats the processing from S40 again after a predetermined time has elapsed.

In S42, the ECU 20 recognizes the reaction delay time of the driver against the changes in the external environment of the vehicle by the driver situation recognition unit 28. The driver situation recognition unit 28 recognizes the reaction delay time of the driver against the changes in the external environment of the vehicle based on at least one of operation by the driver detected by the driving operation detection unit 5 and the driver image captured by the driver monitor camera 6.

In S44, the ECU 20 determines whether or not the difference between the reaction delay time of the driver and the reference reaction delay time is equal to or greater than the overconfidence threshold value using the overconfidence determination unit 29. If it is determined that the difference between the reaction delay time of the driver and the reference reaction delay time is equal to or greater than the overconfidence threshold value (YES in S44), the ECU 20 makes the process proceed to S46. If it is determined that the difference between the reaction delay time of the driver and the reference reaction delay time is not equal to or greater than the overconfidence threshold value (NO in S44), the ECU 20 makes the process proceed to S48.

In S46, the ECU 20 determines that the driver is in the system overconfidence state using the overconfidence determination unit 29. In S48, the ECU 20 determines that the driver is not in the system overconfidence state using the overconfidence determination unit 29.

Anxiety Elicitation Situation Determination Processing

Figure 7:
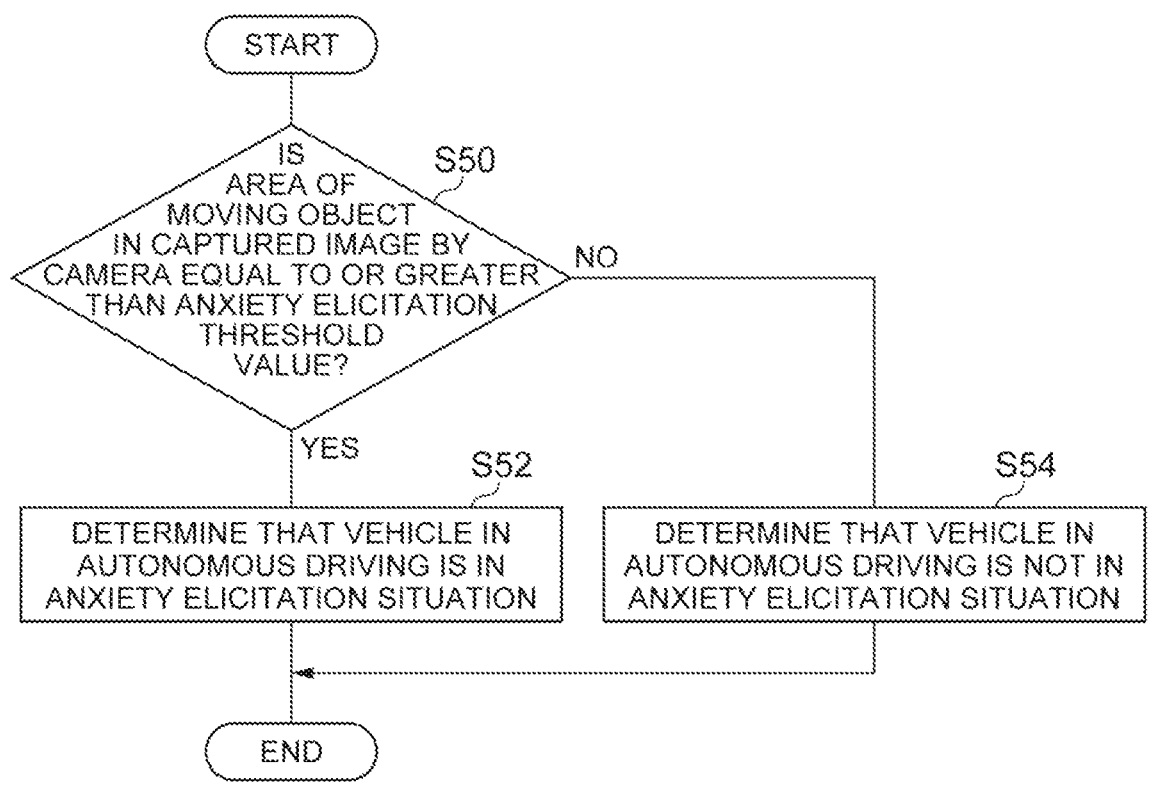
FIG. 7 is a flowchart illustrating an example of anxiety elicitation situation determination processing.

FIG. 7 is a flowchart illustrating an example of the anxiety elicitation situation determination processing. The anxiety elicitation situation determination processing corresponds to the processing in S26 illustrated in FIG. 5.

As illustrated in FIG. 7, as S50, the ECU 20 determines whether or not the area of the moving object in the image captured by the camera that images ahead of the vehicle is equal to or greater than the anxiety elicitation threshold value using the anxiety elicitation situation determination unit 30. The anxiety elicitation situation determination unit 30 performs the above-described determination based on the image captured by the camera that images ahead of the vehicle. If it is determined that the area of the moving object in the image captured by the camera is equal to or greater than the anxiety elicitation threshold value (YES in S50), the ECU 20 makes the process proceed to S52. If it is determined that the area of the moving object in the image captured by the camera is not equal to or greater than the anxiety elicitation threshold value (NO in S50), the ECU 20 makes the process proceed to S54.

In S52, the ECU 20 determines that the vehicle in the autonomous driving is in the anxiety elicitation situation using the anxiety elicitation situation determination unit 30. In S54, the ECU 20 determines that the vehicle in the autonomous driving is not in the anxiety elicitation situation by the anxiety elicitation situation determination unit 30.

Operational Effects of Autonomous Driving System in First Embodiment

According to the autonomous driving system 100 in the first embodiment described above, if it is determined by the normal driving situation determination unit 27 that the autonomous driving is in the normal driving situation and if it is determined by the overconfidence determination unit 29 that the driver is in the system overconfidence state, the alert is output when it is determined by the anxiety elicitation situation determination unit 30 that the vehicle is not in the anxiety elicitation situation. In this way, in the autonomous driving system 100, it is possible to appropriately eliminate the driver's system overconfidence state during the autonomous driving by awakening the driver who is in the system overconfidence state by outputting the alert while ensuring that the autonomous driving is in the normal driving situation.

In addition, in the autonomous driving system 100, when the vehicle is in the anxiety elicitation situation, since the driver may think the alert as the usual warning to pay attention to the anxiety elicitation situation, the alert is not output when the vehicle is in the anxiety elicitation situation. In this way, in the autonomous driving system 100, it is possible to suppress the output of the unnecessary alerts. Furthermore, in the autonomous driving system 100, since even the usual warning including the alert is not performed when the vehicle is in the anxiety elicitation situation, it is possible to cause the driver to have a question whether the autonomous driving system 100 may not recognize the anxiety elicitation situation, and thus, it is possible to eliminate the driver's system overconfidence state.

In addition, according to the autonomous driving system 100, since the driver is likely to be more anxious about the traveling of the vehicle as the area of the obstacle that occupies the field of view of the driver seeing ahead of the vehicle increases, if the area of the moving object in the image captured by the camera that images ahead of the vehicle is greater than the anxiety elicitation threshold value, it is possible to determine that the vehicle in the autonomous driving is in the anxiety elicitation situation.

In addition, in the autonomous driving system 100, for the driver in the system overconfidence state, since it is considered that the reaction delay time for the changes in the external environment of the vehicle is more delayed compared to the warning reaction delay time, it is possible to appropriately determine the system overconfidence state by determining that the driver is in the system overconfidence state when the difference obtained by subtracting the reference reaction delay time from the reaction delay time of the driver is equal to or greater than the overconfidence threshold value. In addition, by setting the warning reaction delay time of the driver as the reference reaction delay time, it is possible to determine the system overconfidence state based on the individuality of the driver compared to a case where the reference reaction delay time is a fixed value.

Furthermore, according to the autonomous driving system 100, by determining the normal driving situation regarding the autonomous driving using the system confidence degree relating to the autonomous driving, it is possible to appropriately determine whether or not the autonomous driving is in the normal driving situation compared to a case where the system confidence degree is not used.

Second Embodiment

Figure 8:
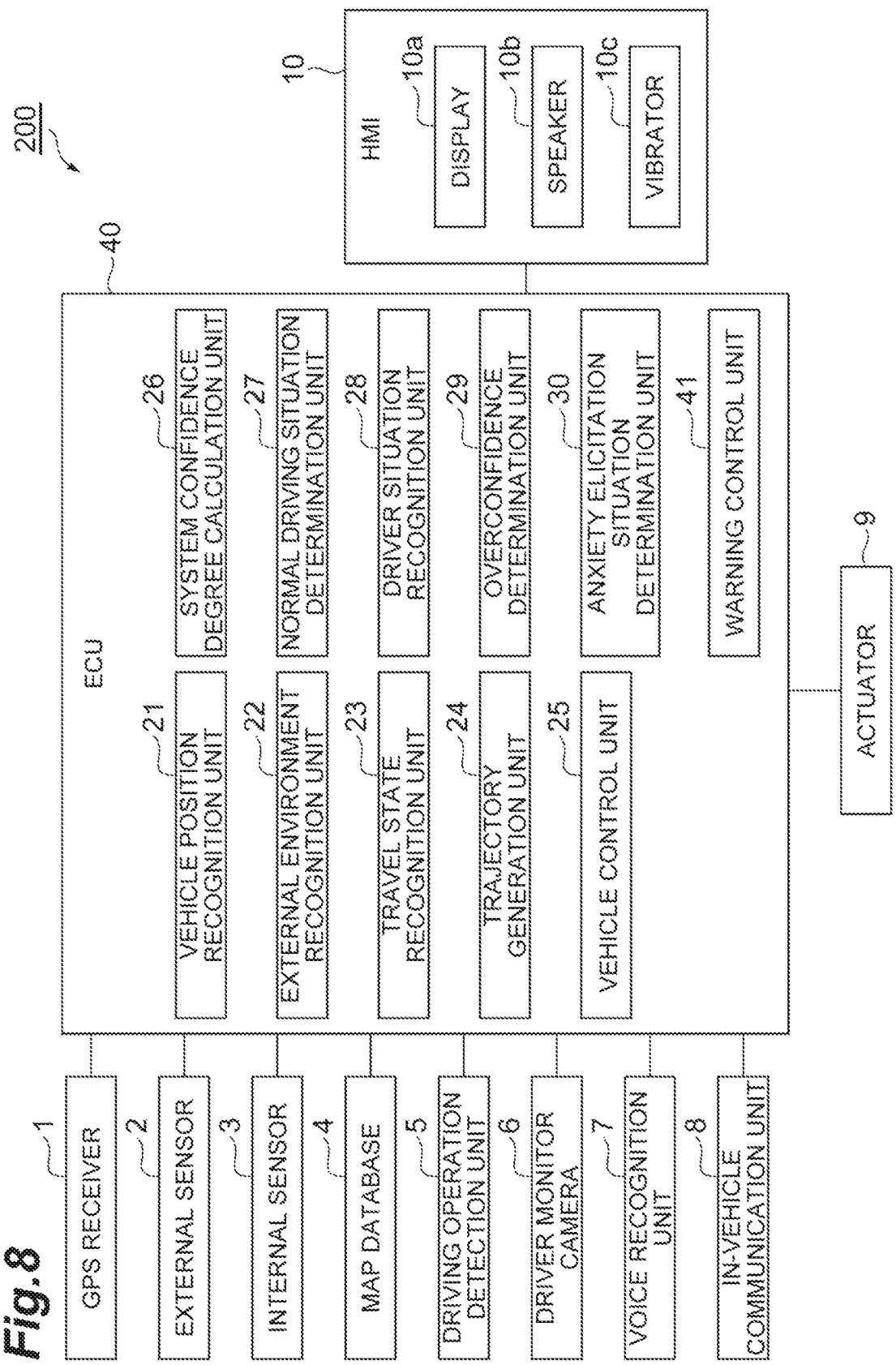
FIG. 8 is a block diagram illustrating an autonomous driving system in a second embodiment.

Next, an autonomous driving system in a second embodiment will be described with reference to the drawings. FIG. 8 is a block diagram illustrating the autonomous driving system according to the second embodiment. The same reference signs will be given to the same configuration as those in the first embodiment, and the descriptions thereof will not be repeated.

Configurations of Autonomous Driving System in Second Embodiment

An autonomous driving system 200 in the second embodiment illustrated in FIG. 8 differs from the system in the first embodiment in a point that the warning control unit 41 performs a delayed output of the alert than that in the first embodiment. The delayed output of the alert is a mode in which the driver's system overconfidence state is aimed to be eliminated by outputting the alert in a delayed manner even if the anxiety elicitation situation has occurred.

As illustrated in FIG. 8, the ECU 40 of the autonomous driving system 200 differs in the function of a warning control unit 41 from that in the first embodiment. Specifically, when it is determined by the normal driving situation determination unit 27 that the autonomous driving is in the normal driving situation, when it is determined by the overconfidence determination unit 29 that the driver is in the system overconfidence state, and when it is determined by the anxiety elicitation situation determination unit 30 that the vehicle in the autonomous driving is in the anxiety elicitation situation, the warning control unit 41 performs the delayed output of the alert.

Figure 9A:
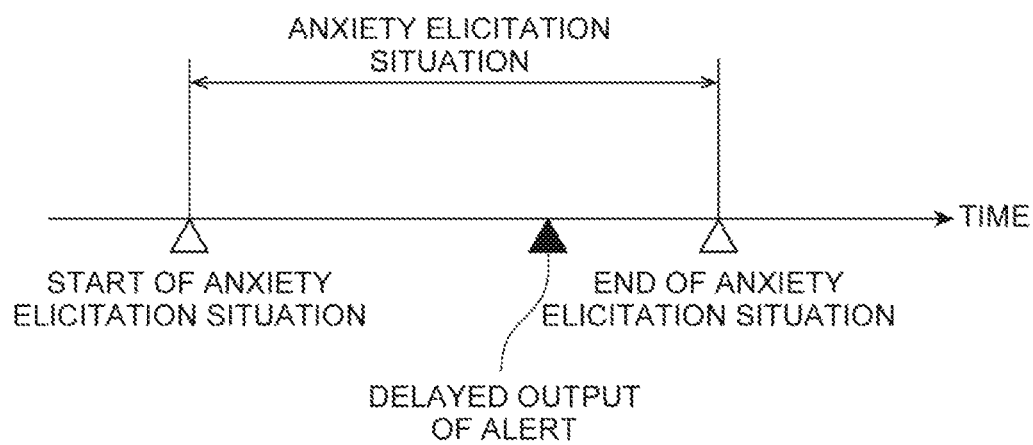
FIG. 9A is a diagram for explaining an example of a delayed output of an alert.

Here, FIG. 9A is a diagram for explaining an example of the delayed output of the alert. On a time axis illustrated in FIG. 9A, the start and end time points of the anxiety elicitation situation and a delayed output time point of the alert are illustrated. Here, as the anxiety elicitation situation, it can be assumed that a situation in which another vehicle (an overtaking vehicle) that overtakes the side of the vehicle at a high speed. In this case, a time point the overtaking vehicle appears within a certain distance from the vehicle can be set as the anxiety elicitation situation start time point, and a time point when the overtaking vehicle is separated from the vehicle by a certain distance or more can be set as the anxiety elicitation situation end time point. The autonomous driving system 200 recognizes the overtaking vehicle from the anxiety elicitation situation start time point to the anxiety elicitation situation end time point. The anxiety elicitation situation start time point may be a time point when it is determined by the anxiety elicitation situation determination unit 30 that the vehicle is in the anxiety elicitation situation for the first time.

In the situation in FIG. 9A, since it is determined that the autonomous driving is in the normal driving situation, it is determined that the driver is in the system overconfidence state, and it is determined that the vehicle in the autonomous driving is in the anxiety elicitation situation, the warning control unit 41 performs the delayed output of the alert.

The warning control unit 41 outputs the alert in the delayed manner, for example, after a predetermined time from the start of the anxiety elicitation situation. The warning control unit 41 may output the alert in the delayed manner at the timing immediately before the end of the anxiety elicitation situation (for example, immediately before the overtaking vehicle leaves the vehicle a certain distance or more). As described above, the autonomous driving system 200 can cause the driver to feel not to have the overconfidence in the autonomous driving system 200 by outputting the alert in the delayed manner at the timing after the driver is aware of the overtaking vehicle.

Figure 9B:
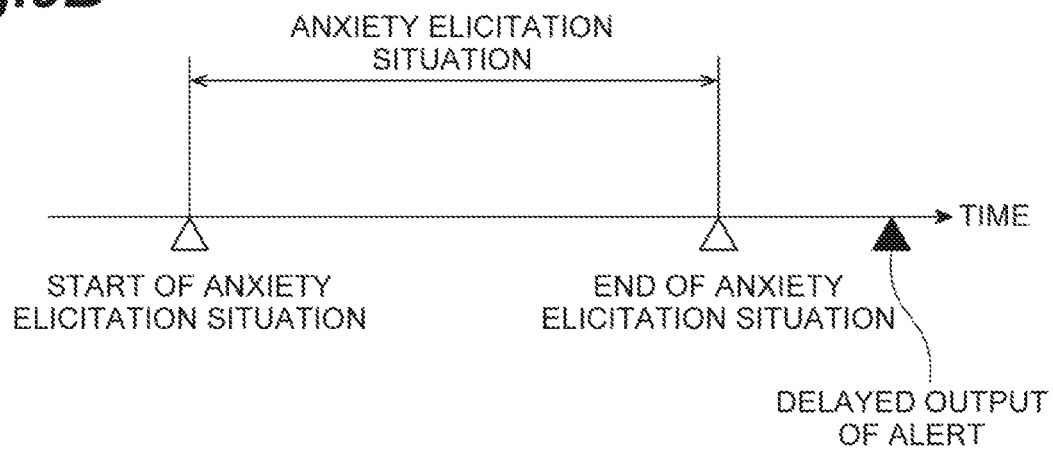
FIG. 9B is a diagram for explaining another example of a delayed output of an alert.

FIG. 9B is a diagram for explaining another example of the delayed output of the alert. In FIG. 9B, the warning control unit 41 outputs the alert in the delayed manner after the end of the anxiety elicitation situation. The warning control unit 41 may output alert in the delayed manner at the timing when the vehicle in the autonomous driving stops after the end of the anxiety elicitation situation.

In the case of delayed output, the content of the alert content may be the same as the non-delayed alert (the alert in the first embodiment), or may be different from the non-delayed alert. In the case of delayed output, the content of the alert may include a message saying that the alert for the anxiety elicitation situation (such as the overtaking vehicle) has been delayed. As described above, even when the driver does not pay attention to the anxiety elicitation situation at all, by transferring information including the anxiety elicitation situation to the driver, it is possible to cause the driver to feel not to have the overconfidence in the autonomous driving system 200. As a part of the delayed output of the alert, the warning control unit 41 may play an image regarding the anxiety elicitation situation (for example, an image of the overtaking vehicle) after the end of the anxiety elicitation situation for the driver to see.

Figure 10:
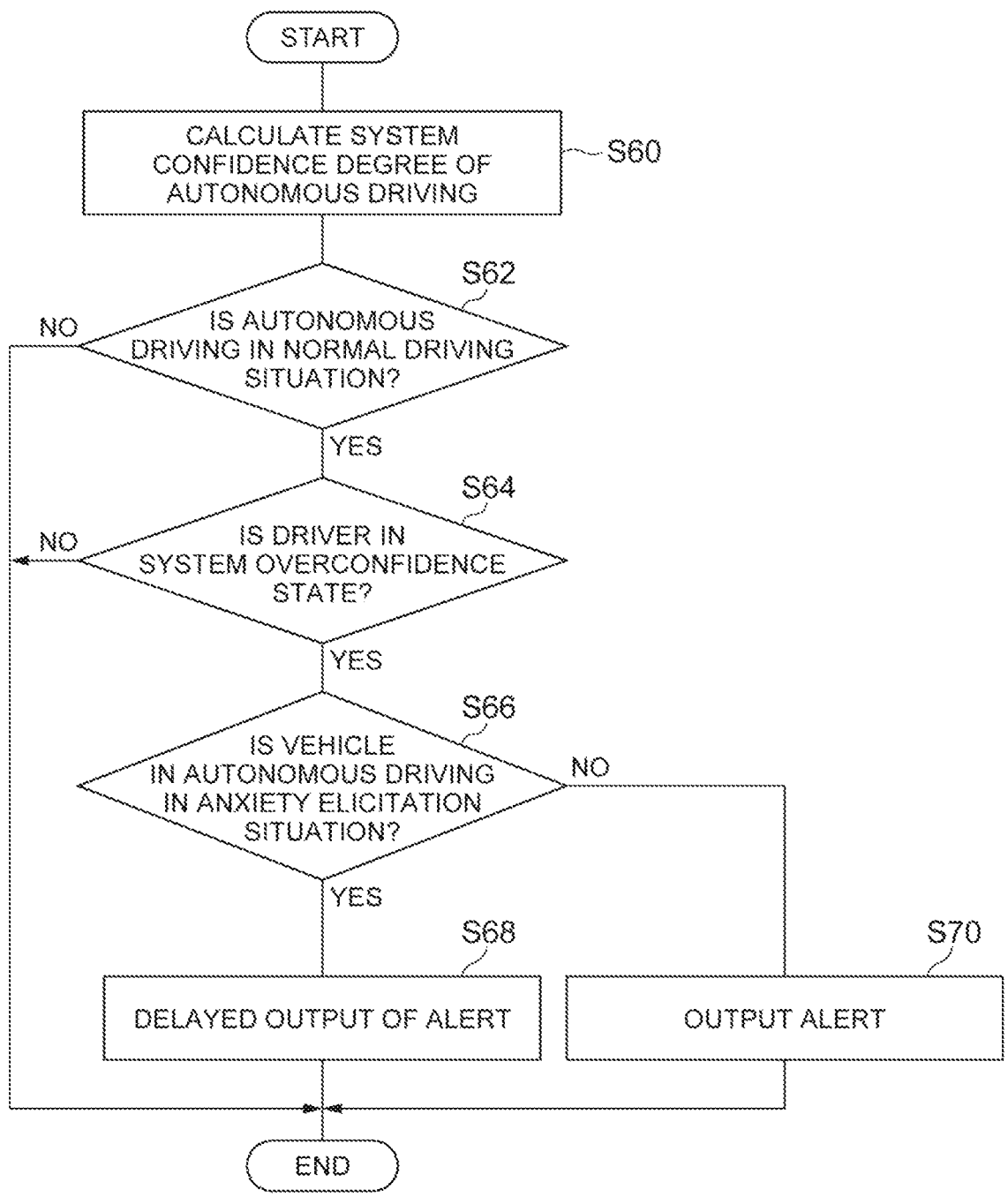
FIG. 10 is a flowchart illustrating an example of alert output processing in the second embodiment.

Processing by Autonomous Driving System in Second Embodiment Alert Output Processing FIG. 10 is a flowchart illustrating an example of alert output processing according to the second embodiment. Processing other than the alert output processing can be the same as those in the first embodiment. The processing in S60, S62, S64 and S66 illustrated in FIG. 10 are similar to the processing in S20, S22, S24 and S26 illustrated in FIG. 5.

As illustrated in FIG. 10, as S60, the ECU 40 calculates the system confidence degree of the autonomous driving using the system confidence degree calculation unit 26. In S62, the ECU 40 determines whether or not the autonomous driving is in the normal driving situation using the normal driving situation determination unit 27. If it is determined that the autonomous driving is in the normal driving situation (YES in S62), the ECU 40 makes the process proceed to S64. If it is determined that the autonomous driving is not in the normal driving situation (NO in S62), the ECU 40 ends the current processing. Thereafter, if the autonomous driving is continued, the ECU 40 repeats the processing from S60 again after a predetermined time has elapsed.

In S64, the ECU 40 determines whether or not the driver is in the system overconfidence state using the overconfidence determination unit 29. If it is determined that the driver is in the system overconfidence state (YES in S64), the ECU 40 makes the process proceed to S66. If it is determined that the driver is not in the system overconfidence state (NO in S64), the ECU 40 ends the current processing. Thereafter, if the autonomous driving is continued, the ECU 40 repeats the processing from S60 again after a predetermined time has elapsed.

In S66, the ECU 40 determines whether or not the vehicle in the autonomous driving is in the anxiety elicitation situation using the anxiety elicitation situation determination unit 30. If it is determined that the vehicle in the autonomous driving is in the anxiety elicitation situation (YES in S66), the ECU 40 makes the process proceed to S68. If it is determined that the vehicle in the autonomous driving is not in the anxiety elicitation situation (NO in S66), the ECU 40 proceeds the process to S70.

In S68, the ECU 40 performs the delayed output of the alert using the warning control unit 41. The warning control unit 41 outputs the alert in the delayed manner, for example, after a predetermined time has elapsed from the start of the anxiety elicitation situation. Thereafter, the ECU 40 ends the current processing. The ECU 40 repeats the processing from S60 again after a predetermined standby time has elapsed.

In S70, the ECU 40 outputs the alert using the warning control unit 41. The warning control unit 41 outputs the alert by transmitting a control signal to the HMI 10. Thereafter, the ECU 40 ends the current processing. The ECU 40 repeats the processing from S60 again after a predetermined standby time has elapsed.

Operational Effects of Autonomous Driving System in Second Embodiment

According to the autonomous driving system 200 in the second embodiment described above, since the driver is likely to be anxious about the external environment of the vehicle when it is determined that the vehicle is in the anxiety elicitation situation, it is possible to appropriately eliminate the driver's system overconfidence state by causing the driver to think that the autonomous driving system recognizes the anxiety elicitation situation of which the driver is aware, in the delayed manner by means of performing the delayed output of the alert.

In addition, in the autonomous driving system 200, even when the driver is not aware of the anxiety elicitation situation, by performing warning including the information on the delayed anxiety elicitation situation as a part of the delayed output of the alert, the fact that the autonomous driving system 200 recognizes the anxiety elicitation situation in the delayed manner can be transferred to the driver, and thus, it is possible to appropriately eliminate the driver's system overconfidence state.

As described above, the embodiments of the present disclosure were described, however, the present disclosure is not limited to the embodiments described above. In addition to the above-described embodiments, the present disclosure can be embodied in various forms including various modifications and improvements based on the knowledge of those skilled in the art.

The overconfidence determination unit 29 may determine whether or not the driver is in the system overconfidence state based on the driver's driving action time Td when it is determined by the anxiety elicitation situation determination unit 30 that the vehicle in the autonomous driving is in the anxiety elicitation situation. Since the driver is likely to be in the system overconfidence state when the ratio of the driver's driving action under the anxiety elicitation situation is small, the overconfidence determination unit 29 can determine whether or not the driver is in the system overconfidence state based on the driver's driving action time Td under the anxiety elicitation situation. For example, if the driver's driving action time Td under the anxiety elicitation situation is shorter than an overconfidence ratio threshold value, the overconfidence determination unit 29 determines that the driver is in the system overconfidence state.

The autonomous driving systems 100 and 200 do not necessarily need to include the system confidence degree calculation unit 26. That is, the autonomous driving systems 100 and 200 do not necessarily need to calculate the system confidence degree. In this case, the normal driving situation determination unit 27 may determine whether or not the autonomous driving is in the normal driving situation based on at least one of the position of the vehicle on the map, the external environment of the vehicle, the travel state of the vehicle, and the trajectory of the vehicle, without using the system confidence degree.

The autonomous driving system 100 does not necessarily need to include the anxiety elicitation situation determination unit 30. That is, the autonomous driving system 100 does not necessarily need to determine whether or not the vehicle in the autonomous driving is in the anxiety elicitation situation or not. In this case, if it is determined by the normal driving situation determination unit 27 that the autonomous driving is in the normal driving situation, and if it is determined by the overconfidence determination unit 29 that the driver is in the system overconfidence state, the warning control unit 31 outputs the alert. If it is determined by the normal driving situation determination unit 27 that the autonomous driving is not in the normal driving situation, or if it is determined by the overconfidence determination unit 29 that the driver is not in the system overconfidence state, the warning control unit 31 does not output the alert.

The driver situation recognition unit 28 may recognize the driver's reaction against the alert after the alert is output. The warning control units 31 and 41 may output the alert again if the driver's reaction against the alert is not recognized. When outputting an alert again, the warning control units 31 and 41 may output the alert strongly compared to the alert output previously. The strong output is, for example, an output with a larger volume in the case of audio output, or an output of strong luminance in the case of image display. The strong output may be realized by changing the frequency of the voice and the chromaticity of the image.

What is claimed is:

1. An autonomous driving system that performs an autonomous driving of a vehicle and provides various warnings to a driver of the vehicle during the autonomous driving, the system comprising an electronic control unit configured to:

recognize a position of the vehicle on a map;
    recognize an external environment of the vehicle;
    recognize a travel state of the vehicle;
    generate a trajectory of the vehicle used for the autonomous driving based on map information, the position of the vehicle on the map, the external environment of the vehicle, and the travel state of the vehicle;
    determine whether or not the autonomous driving is in a normal driving situation based on at least one of the position of the vehicle on the map, the external environment of the vehicle, the travel state of the vehicle, and the trajectory of the vehicle;

recognize a driver situation comprising at least one of a reaction delay time of the driver against changes in the external environment of the vehicle, a warning reaction delay time of the driver against the warning, and a driver's non-driving action time;

determine whether or not the driver is in a system overconfidence state based on a result of recognition of the driver situation;

output an alert when it is determined that the autonomous driving is in the normal driving situation and it is determined that the driver is in the system overconfidence state;

determine whether or not the vehicle in the autonomous driving is in an anxiety elicitation situation based on the external environment of the vehicle;

output the alert when it is determined that the vehicle is not in the anxiety elicitation situation in case where it is determined that the autonomous driving is in the normal driving situation and it is determined that the driver is in the system overconfidence state; and not output the alert when it is determined that the vehicle is in the anxiety elicitation situation in case where it is determined that the autonomous driving is in the normal driving situation and it is determined that the driver is in the system overconfidence state.

2. The autonomous driving system according to claim 1, wherein the electronic control unit is configured to:

determine that the vehicle in the autonomous driving is in the anxiety elicitation situation if an area of a moving object in a captured image by a camera that images ahead of the vehicle as the external environment of the vehicle is equal to or greater than an anxiety elicitation threshold value.

3. The autonomous driving system according to claim 2, wherein the electronic control unit is configured to:

store the warning reaction delay time of the driver against the warning as a reference reaction delay time; and determine that the driver is in the system overconfidence state if a difference obtained by subtracting the reference reaction delay time from the reaction delay time of the driver against the changes in the external environment of the vehicle is equal to or longer than an overconfidence threshold value.

4. The autonomous driving system according to claim 2, wherein the electronic control unit is configured to:

calculate a system confidence degree regarding the autonomous driving based on at least one of the position of the vehicle on the map, the external environment of the vehicle, the travel state of the vehicle, and the trajectory of the vehicle; and determine that the autonomous driving is not in the normal driving situation if the system confidence degree is lower than a normal driving threshold value.

5. The autonomous driving system according to claim 1, wherein the electronic control unit is configured to:

store the warning reaction delay time of the driver against the warning as a reference reaction delay time; and determine that the driver is in the system overconfidence state if a difference obtained by subtracting the reference reaction delay time from the reaction delay time of the driver against the changes in the external environment of the vehicle is equal to or longer than an overconfidence threshold value.

6. The autonomous driving system according to claim 1, wherein the electronic control unit is configured to:

calculate a system confidence degree regarding the autonomous driving based on at least one of the position of the vehicle on the map, the external environment of the vehicle, the travel state of the vehicle, and the trajectory of the vehicle; and determine that the autonomous driving is not in the normal driving situation if the system confidence degree is lower than a normal driving threshold value.

7. An autonomous driving system that performs an autonomous driving of a vehicle and provides various warnings to a driver of the vehicle during the autonomous driving, the system comprising an electronic control unit configured to:

recognize a position of the vehicle on a map;

recognize an external environment of the vehicle;

recognize a travel state of the vehicle;

generate a trajectory of the vehicle used for the autonomous driving based on map information, the position of the vehicle on the map, the external environment of the vehicle, and the travel state of the vehicle;

determine whether or not the autonomous driving is in a normal driving situation based on at least one of the position of the vehicle on the map, the external environment of the vehicle, the travel state of the vehicle, and the trajectory of the vehicle;

recognize a driver situation comprising at least one of a reaction delay time of the driver against changes in the external environment of the vehicle, a warning reaction delay time of the driver against the warning, and a driver's non-driving action time;

determine whether or not the driver is in a system overconfidence state based on a result of recognition of the driver situation;

output an alert when it is determined that the autonomous driving is in the normal driving situation and it is determined that the driver is in the system overconfidence state;

determine whether or not the vehicle in the autonomous driving is in an anxiety elicitation situation based on the external environment of the vehicle;

output the alert when it is determined that the vehicle is not in the anxiety elicitation situation in case where it is determined that the autonomous driving is in the normal driving situation and it is determined that the driver is in the system overconfidence state; and output the alert in a delayed manner when it is determined that the vehicle is in the anxiety elicitation situation in case where it is determined that the autonomous driving is in the normal driving situation and it is determined that the driver is in the system overconfidence state.

8. The autonomous driving system according to claim 7, wherein the electronic control unit is configured to:

determine that the vehicle in the autonomous driving is in the anxiety elicitation situation if an area of a moving object in a captured image by a camera that images ahead of the vehicle as the external environment of the vehicle is equal to or greater than an anxiety elicitation threshold value.

9. The autonomous driving system according to claim 7, wherein the electronic control unit is configured to:

store the warning reaction delay time of the driver against the warning as a reference reaction delay time; and determine that the driver is in the system overconfidence state if a difference obtained by subtracting the reference reaction delay time from the reaction delay time of the driver against the changes in the external environment of the vehicle is equal to or longer than an overconfidence threshold value.

10. The autonomous driving system according to claim 7, wherein the electronic control unit is configured to:
    calculate a system confidence degree regarding the autonomous driving based on at least one of the position of the vehicle on the map, the external environment of the vehicle, the travel state of the vehicle, and the trajectory of the vehicle; and
    determine that the autonomous driving is not in the normal driving situation if the system confidence degree is lower than a normal driving threshold value.

* * * * *

UNITED STATES PATENT AND TRADEMARK OFFICE
CERTIFICATE OF CORRECTION

PATENT NO. : 10,875,545 B2
APPLICATION NO. : 16/704640
DATED : December 29, 2020
INVENTOR(S) : Takayuki Iwamoto et al.

It is certified that error appears in the above-identified patent and that said Letters Patent is hereby corrected as shown below:

On the Title Page

Item (71), applicant 1, city, delete "Toyota" and insert --Toyota-shi, Aichi-ken--, therefor.

Item (72), Inventor 1, city, delete "Shizuoka" and insert --Sunto-gun, Shizuoka--, therefor.

Item (72), Inventor 2, city, delete "Yokohama" and insert --Yokohama-shi, Kanagawa--, therefor.

Item (72), Inventor 3, city, delete "Susono" and insert --Susono-shi, Shizuoka--, therefor.

Item (72), Inventor 4, city, delete "Susono" and insert --Susono-shi, Shizuoka--, therefor.

Item (73), assignee 1, city, delete "Toyota" and insert --Toyota-shi, Aichi-ken--, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*